United States Patent
Acharya et al.

(10) Patent No.: US 7,848,946 B2
(45) Date of Patent: Dec. 7, 2010

(54) SALES HISTORY DECOMPOSITION

(75) Inventors: Suresh Acharya, Germantown, MD (US); Vikas Sabnani, Sunnyvale, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 1063 days.

(21) Appl. No.: 11/033,487

(22) Filed: Jan. 12, 2005
(Under 37 CFR 1.47)

(65) Prior Publication Data

US 2005/0256759 A1    Nov. 17, 2005

Related U.S. Application Data

(60) Provisional application No. 60/535,715, filed on Jan. 12, 2004.

(51) Int. Cl.
*G06F 17/30* (2006.01)
(52) U.S. Cl. .................................................. 705/10
(58) Field of Classification Search .................... 705/7, 705/8, 36 R, 10
See application file for complete search history.

(56) References Cited

U.S. PATENT DOCUMENTS

| | | | |
|---|---|---|---|
| 4,509,123 A | 4/1985 | Vereen | |
| 4,554,446 A | 11/1985 | Murphy | |
| 4,636,950 A | 1/1987 | Caswell et al. | |
| 4,887,077 A | 12/1989 | Irby et al. | |
| 4,887,208 A | 12/1989 | Schneider et al. | |
| 4,937,743 A | 6/1990 | Rassman et al. | |
| 5,091,713 A | 2/1992 | Horne et al. | |
| 5,231,567 A | 7/1993 | Matoba et al. | |
| 5,233,533 A | 8/1993 | Edstrom et al. | |
| 5,237,495 A | 8/1993 | Moril | |
| 5,237,497 A | 8/1993 | Sitarski | |
| 5,287,267 A | 2/1994 | Jayaraman et al. | |

(Continued)

FOREIGN PATENT DOCUMENTS

JP    2001-331691    11/2001

OTHER PUBLICATIONS

Decomposition the Sales Promotion Bump with Store Data, Harald J Van Heerde, Peter S H Leeflang; Marketing Science; Summer 2004; 23, 3; ABI/INFORM Global p. 317-334.*

(Continued)

*Primary Examiner*—Beth V Boswell
*Assistant Examiner*—Luis Santiago
(74) *Attorney, Agent, or Firm*—Sheridan Ross P.C.

(57) ABSTRACT

A statistical system and method for filters sales history to yield two demand series—one that is time insensitive (i.e. function of price and promotional activities only) and another that is price & promotional activities insensitive (i.e. function of temporal factors only). Once this task is completed, then specialized econometric techniques can be used to model the former and specialized time series techniques can be used to model the latter. In one embodiment, the present invention provides method and related system comprising the iterative steps of:

mapping definitions of sales data;
time slotting of the sales data;
aggregating the sales data;
initial estimating of a trend in the sales data;
computing de-trended sales history using the trend estimate;
regressing to remove price, seasonal, and marketing instruments effects;
removing the estimated seasonal, price and marketing instrument effects from the sales data;
re-estimating trend effects from the sales data having the removed estimated seasonal, price and marketing instrument effects; and
computing a de-trended and de-seasonalized sales data.

13 Claims, 8 Drawing Sheets

U.S. PATENT DOCUMENTS

| | | | |
|---|---|---|---|
| 5,299,115 | A | 3/1994 | Fields et al. |
| 5,377,095 | A | 12/1994 | Maeda et al. |
| 5,383,112 | A | 1/1995 | Clark |
| 5,446,890 | A | 8/1995 | Renslo et al. |
| 5,459,656 | A * | 10/1995 | Fields et al. .................... 705/7 |
| 5,463,555 | A | 10/1995 | Ward et al. |
| 5,526,944 | A | 6/1996 | Merl |
| 5,568,489 | A | 10/1996 | Yien et al. |
| 5,581,461 | A | 12/1996 | Coll et al. |
| 5,615,109 | A | 3/1997 | Eder |
| 5,657,453 | A | 8/1997 | Taoka et al. |
| 5,712,985 | A | 1/1998 | Lee et al. |
| 5,727,164 | A | 3/1998 | Kaye et al. |
| 5,740,425 | A | 4/1998 | Povilus |
| 5,765,138 | A | 6/1998 | Aycock et al. |
| 5,765,143 | A | 6/1998 | Sheldon et al. |
| 5,790,536 | A | 8/1998 | Mahany et al. |
| 5,818,336 | A | 10/1998 | Varga et al. |
| 5,823,948 | A | 10/1998 | Ross et al. |
| 5,870,724 | A | 2/1999 | Lawlor et al. |
| 5,884,300 | A | 3/1999 | Brockman |
| 5,914,878 | A | 6/1999 | Yamamoto et al. |
| 5,918,213 | A | 6/1999 | Bernard et al. |
| 5,933,813 | A | 8/1999 | Teicher et al. |
| 5,937,037 | A | 8/1999 | Kamel et al. |
| 5,940,807 | A | 8/1999 | Purcell |
| 5,953,707 | A | 9/1999 | Huang et al. |
| 5,960,407 | A | 9/1999 | Vivona |
| 5,962,834 | A | 10/1999 | Markman |
| 5,963,134 | A | 10/1999 | Bowers et al. |
| 5,963,918 | A | 10/1999 | Reagan et al. |
| 5,963,919 | A | 10/1999 | Brinkley et al. |
| 5,963,920 | A | 10/1999 | Rose et al. |
| 5,970,465 | A | 10/1999 | Dietrich et al. |
| 5,974,395 | A | 10/1999 | Bellini et al. |
| 5,974,460 | A | 10/1999 | Maddalozzo, Jr. et al. |
| 5,983,194 | A | 11/1999 | Hogge et al. |
| 5,995,945 | A | 11/1999 | Notani et al. |
| 6,006,192 | A | 12/1999 | Cheng et al. |
| 6,006,196 | A | 12/1999 | Feigin et al. |
| 6,009,407 | A | 12/1999 | Garg |
| 6,021,396 | A | 2/2000 | Ramaswamy et al. |
| 6,023,683 | A | 2/2000 | Johnson et al. |
| 6,032,125 | A * | 2/2000 | Ando .......................... 705/10 |
| 6,061,691 | A | 5/2000 | Fox |
| 6,064,967 | A | 5/2000 | Speicher |
| 6,073,107 | A | 6/2000 | Minkiewicz et al. |
| 6,076,071 | A | 6/2000 | Freeny, Jr. |
| 6,078,893 | A | 6/2000 | Oimet et al. |
| 6,078,900 | A | 6/2000 | Ettl et al. |
| 6,078,906 | A | 6/2000 | Huberman |
| 6,081,789 | A | 6/2000 | Purcell |
| 6,088,681 | A | 7/2000 | Coleman et al. |
| 6,094,641 | A | 7/2000 | Oimet et al. |
| 6,101,484 | A | 8/2000 | Halbert et al. |
| 6,105,004 | A | 8/2000 | Halperin |
| 6,115,642 | A | 9/2000 | Brown et al. |
| 6,119,101 | A | 9/2000 | Peckover |
| 6,138,103 | A | 10/2000 | Cheng et al. |
| 6,148,291 | A | 11/2000 | Radican |
| 6,151,582 | A * | 11/2000 | Huang et al. .................... 705/8 |
| 6,157,915 | A | 12/2000 | Bhaskaran et al. |
| 6,167,380 | A | 12/2000 | Kennedy et al. |
| 6,167,385 | A | 12/2000 | Hartley-Urquhart |
| 6,173,210 | B1 | 1/2001 | Bjornson et al. |
| 6,198,980 | B1 | 3/2001 | Costanza |
| 6,205,431 | B1 | 3/2001 | Willemain et al. |
| 6,415,263 | B1 | 7/2002 | Doss |
| 6,415,270 | B1 | 7/2002 | Rackson et al. |
| 6,456,982 | B1 | 9/2002 | Pilipovic |
| 6,609,101 | B1 | 8/2003 | Landvater |
| 6,611,726 | B1 | 8/2003 | Crosswhite |
| 6,745,150 | B1 | 6/2004 | Breiman |
| 6,804,657 | B1 | 10/2004 | Sultan |
| 6,816,839 | B1 * | 11/2004 | Gung et al. .................... 705/10 |
| 6,832,210 | B1 * | 12/2004 | Li ............................ 705/36 R |
| 6,910,017 | B1 | 6/2005 | Woo et al. |
| 6,963,854 | B1 | 11/2005 | Boyd et al. |
| 7,080,026 | B2 | 7/2006 | Singh et al. |
| 7,120,599 | B2 | 10/2006 | Keyes |
| 7,133,848 | B2 | 11/2006 | Phillips et al. |
| 2002/0120492 | A1 * | 8/2002 | Phillips et al. ................. 705/10 |
| 2003/0078827 | A1 * | 4/2003 | Hoffman ...................... 705/10 |
| 2003/0093357 | A1 | 5/2003 | Guler et al. |
| 2003/0110089 | A1 * | 6/2003 | Villani et al. .................. 705/26 |
| 2003/0220773 | A1 | 11/2003 | Haas et al. |
| 2005/0194431 | A1 * | 9/2005 | Fees et al. .................... 235/375 |
| 2005/0256759 | A1 | 11/2005 | Acharya |
| 2008/0027774 | A1 * | 1/2008 | Jameson ......................... 705/7 |
| 2008/0177593 | A1 * | 7/2008 | Clayton et al. .................. 705/7 |

OTHER PUBLICATIONS

International business operations and management: A model, a theory, and a success index by Dhammanungune, Somchai, D.B.A., United States International University, 1992 , 388 pages; AAT 9219058.*

Cagno, et al., "Multi-criteria Assessment of the Probability of Winning in the Competitive Bidding Process", International Journal of Project Management, 2001, pp. 313-324, vol. 19.

Hu, et al., "Promotion or Demotion? An Empirical Investigation of the Determinants of Top Mutual Fund Manager Change", Fuqua School of Business, Duke University, Sep. 1, 2000, Durham, NC.

Kaplan, "Bayesian Approach to Inventory Control of New Parts", IIE Transactions, Jun. 1988, pp. 151-156, vol. 20, No. 2.

Kiser, "Demand and pricing the breakfast cereals industry", Dissertation, University of Wisconsin-Madison, 1998, pp. 1-128.

Prigent, et al., "An Autoregressive Conditional Binomial Option Pricing Model", THEMA, University of Cergy-Pontoise, Cergy-Pontoise, France, Oct. 1999.

Subrahmanyan, et al., "Developing optimal pricing and inventory policies for retailers who face uncertain demand", Journal of Retailing, 1996, p. 7-24, vol. 72, No. 1.

Tam, et al, "Price elasticity and the growth of computer spending", IEEE Transaction of Engineering Management, May 1999, pp. 1-11, vol. 46, No. 2.

Sanjog, et al., "A cointegration of analysis of demand: implications for pricing", Pricing, Strategy and Practice, 1997, pp. 156-163, vol. 5, No. 4.

International Search Report for International (PCT) Patent Application No. PCT/US03/03004, mailed Mar. 13, 2004.

International Search Report for International (PCT) Patent Application No. PCT/US01/42824, mailed Jan. 29, 2002.

Official Action for U.S. Appl. No. 09/859,674, mailed Jul. 1, 2005, pp. 1-16.

Official Action for U.S. Appl. No. 09/859,674, mailed Jan. 17, 2006, pp. 1-11.

Official Action for U.S. Appl. No. 09/859,674, mailed Sep. 14, 2006, pp. 1-14.

Official Action for U.S. Appl. No. 09/984,347, mailed Dec. 7, 2005, pp. 1-6.

Official Action for U.S. Appl. No. 09/984,347, mailed Dec. 20, 2005, pp. 1-6.

Official Action for U.S. Appl. No. 09/984,347, mailed Feb. 23, 2006, pp. 1-3.

Official Action for U.S. Appl. No. 10/356,717, mailed Jun. 19, 2007, pp. 1-10.

Official Action for U.S. Appl. No. 10/356,717, mailed Jan. 10, 2008, pp. 1-18.

* cited by examiner

SALES HISTORY DECOMPOSITION

CROSS REFERENCE TO RELATED APPLICATION

This application claims priority from U.S. Provisional Application Ser. No. 60/535,715, filed Jan. 12, 2003, the disclosure of which is hereby incorporated by reference in its entirety.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates to a statistical system and method for filtering sales history to yield two demand series—one that is time insensitive (i.e. function of price and promotional activities only) and another that is price & promotional activities insensitive (i.e. function of temporal factors only). Once this task is completed, then specialized econometric techniques can be used to model the former and specialized time series techniques can be used to model the latter.

2. Description of Related Art

The fundamental premise of price/promotions optimization is that demand depends on price and other marketing instruments. It is also well-known that demand is affected by other factors such as seasons, life cycles, market trends, etc. In the absence of price experimentation, client sales history simply captures demand over time in the presence or absence of other marketing instruments, i.e., demand is implicitly captured as a function of time, the price charged and other marketing instruments. In such cases, it is desired that sales history be pre-processed to produce two demand series—one that is time insensitive (i.e., function of price and marketing instruments only) and another that is marketing instruments insensitive (i.e., function of time only). Once this task is completed, then specialized econometric and time series techniques can be used to model each of the two demand series independent of one another.

BRIEF SUMMARY OF THE INVENTION

In response to these and other needs, the present invention provides a system and method for sales history decomposition. The present invention relates to a statistical system and method for filtering sales history to yield two demand series—one that is time insensitive (i.e. function of price and promotional activities only) and another that is price & promotional activities insensitive (i.e. function of temporal factors only). Once this task is completed, then specialized econometric techniques can be used to model the former and specialized time series techniques can be used to model the latter. The present invention proposes a combined approach that models the trend component using a time series modeling approach and the price/marketing instruments and seasonal effects within a causal model (i.e., econometric modeling) framework.

In one embodiment, the present invention provides method and related system comprising the steps of:
 mapping definition of sales data;
 time slotting of the sales data;
 aggregating the sales data;
 initial estimating of a trend in the sales data;
 computing de-trended sales history using the trend estimate;
 regressing to remove price, seasonal, and marketing instruments effects;
 removing the estimated seasonal, price and marketing instrument effects from the sales data;
 re-estimate trend effects from the sales data having the removed estimated seasonal, price and marketing instrument effects; and
 computing a de-trended and de-seasonalized sales data.

The steps of computing de-trended sales history using the trend estimate; regressing to remove price, seasonal, and marketing instruments effects; removing the estimated seasonal, price and marketing instrument effects from the sales data; and re-estimate trend effects from the sales data having the removed estimated seasonal, price and marketing instrument effects, may be repeatedly iterated until a desired solution is achieved. The iteration may continue for a prespecified number of cycles or until a desired a mean revision in trend is achieved, indicating the little further benefit can be produced from further iterations.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein.

DETAILED DESCRIPTION OF THE PREFERRED EMBODIMENTS

Figure 1:
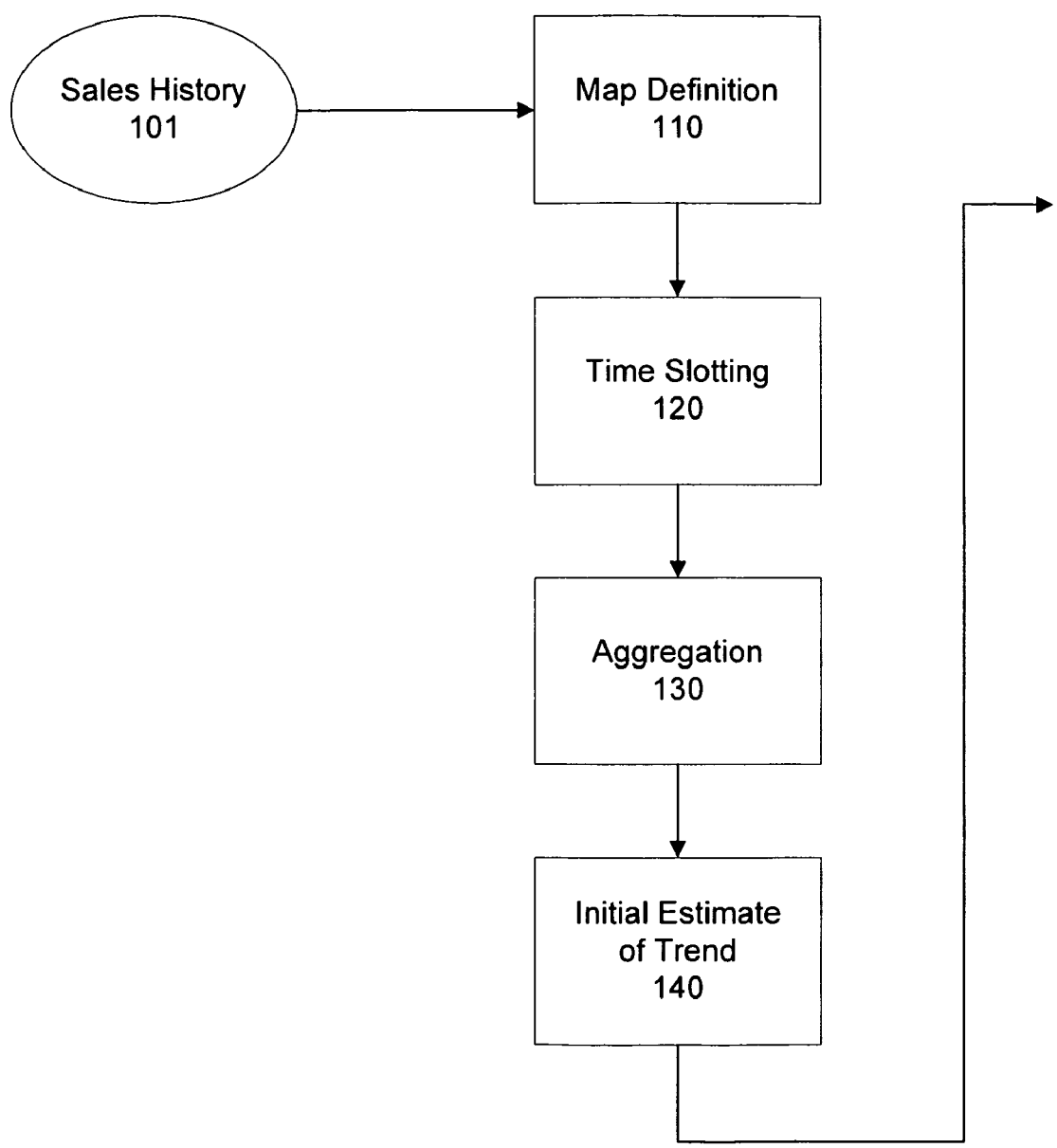
FIG. 1 depicts the steps in a sales history decomposition method in accordance with embodiments of the present invention.
Figure 1:
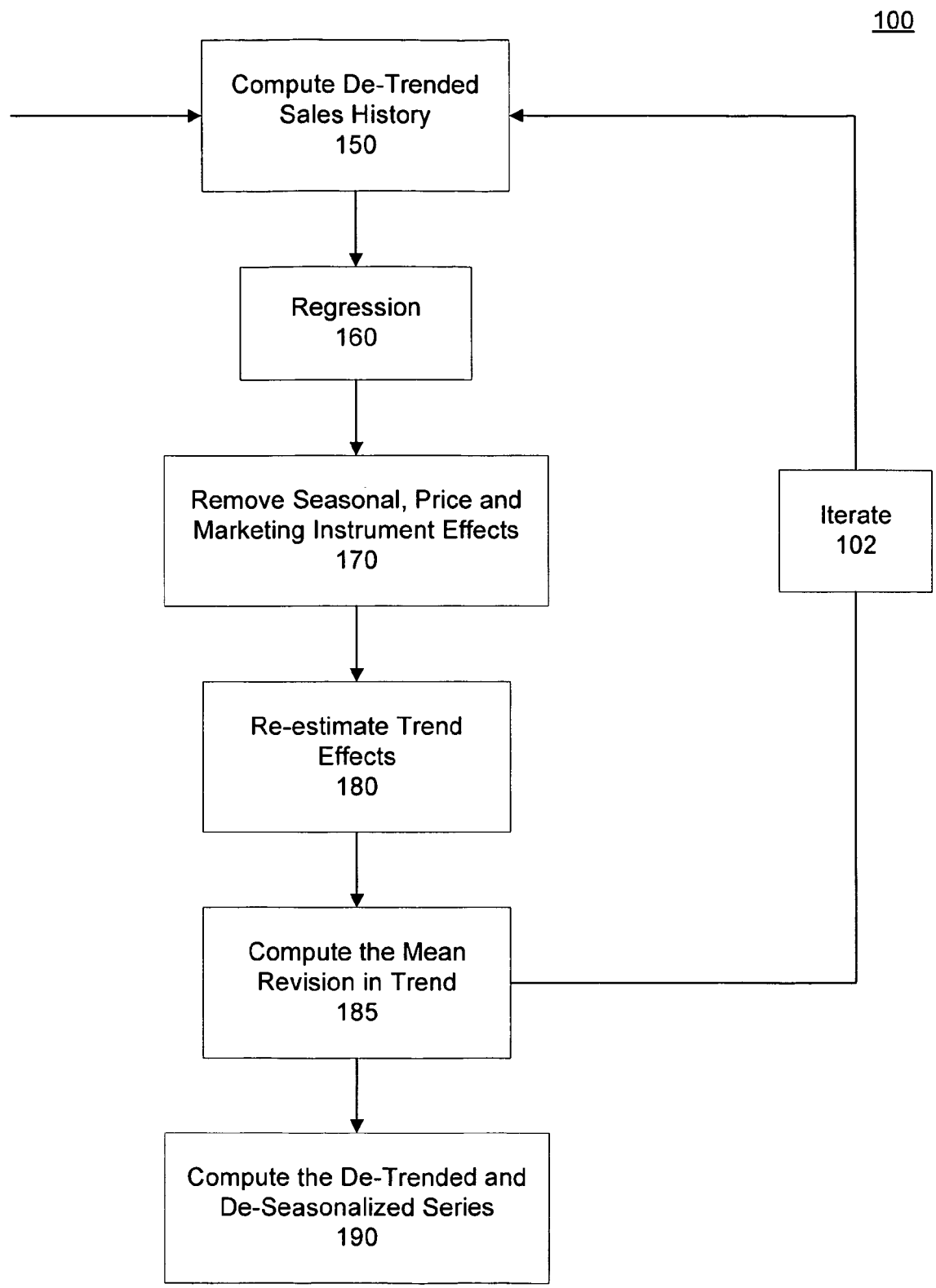

Embodiments of the present invention provide a Sales History Decomposition system and method to discern temporal effects from price and marketing instrument effects using a single unified sales history. The present invention separates temporal effects from price and marketing instrument effects in a manner that the resultant de-trended and de-seasonalized series provides an unbiased representation of price and marketing instrument effects.

At this point, a short overview of sales history decomposition is provided. Specifically, the known methods produce a rough approximation of the underlying temporal effects through Time Series Decomposition. Within the realm of pricing, it is assumed, as expressed in Equation 1, that demand Q at is a function of trends, seasonality, price, marketing instruments (MI), and other variables:

Demand $(t, p, MI) = f$(Trend, Seasonality, Price, $MI$, Other Variables) (EQ. 1)

and the goal is to break down this series into its constituent parts. The known methods used within the economic forecasting literature then decompose a time series into its constituent parts, such determining the relationship of demand over time as a function of trends and seasonality, as expressed in Equation 2:

$$\text{Demand }(t)=f(\text{Trend, Seasonality}) \quad (\text{EQ. 2}).$$

In Time Series Decomposition, various factors are assumed to influence a demand series. As suggested in Equation 1, a time series is typically assumed to comprise of the following factors: Trend (T); Seasonality (S); Price (P) and Marketing Instrument (MI) Effects (i.e., includes shelf price, temporary price reductions, promotional instruments, advertising, etc.); and an Irregular component (I). These factors are discussed in greater detail below.

"Trend" is defined as the long term movement in a series. Trend is a reflection of the underlying level of the series. This includes the underlying level, the long term trend and the medium term cycles. For this reason, trend is sometimes referred to as the trend cycle. In contrast, a trend gradient, as discussed in greater detail below, is a uniformly and constantly increasing or decreasing level, as would be interpreted within a standard linear regression framework. It may be assumed that the trend at any point captures both the level and the local trend gradient at that point. From that perspective, trend can be imagined to be the "dynamic level" of a series.

"Seasonality" represents factors that recur one or more times every year. Seasonal effects are assumed to remain reasonably static over time. There are generally three types of seasonal effects—systematic seasonal influences, trading day effects (effects due to either more or less number of specific types of days in a period) and moving holiday effects (effects due to an event that repeats every day but its exact occurrence in a calendar may change from one year to another).

"Marketing Instrument Effects" represent the influence of temporary price reductions or promotional factors that spur the demand beyond what could be expected under normal circumstances. Promotional effects are generally viewed as external intervention events on the smooth time series process. Unlike trend and seasonality, promotional decisions are rarely independent of expected market demand. For example, more promotions are offered during Christmas season when underlying demand is expected to be high. This aspect of Marketing Instrument Effects confounds the impact on demand and seriously limiting the merchants' ability to recover the effect of promotions.

The "irregular," or residual, component is what remains after the seasonal, trend and promotional components have been removed. Irregulars do not display white noise characteristics. It attempts to explain the short-term variations in the series that are neither systematic nor predictable. The irregular effects may either be true randomness or it may be the result of an external occurrence that impacted the demand, such as a catastrophic natural disaster. If it is the latter, then the corresponding time period must either be pre-processed or directly modeled as an external special seasonal driver.

As an alternative to Time Series Modeling, Econometric Modeling is also known and may be used to estimate pricing effects. Econometricians typically prefer causal models to time series extrapolative techniques. A priori judgments are made for causal factors, and their relationships with response variable are estimated using historical data. These relationships are then used for predictive purposes. Several arguments have been made against such Econometric Modeling methods: (1) Insufficient information about causal factors; (2) Difficult to automate; (3) Too expensive to build; and (4) Predictive accuracy depends upon availability of good causal factors information. On the other hand, arguments in favor of Time Series modeling include: (1) Ease of design and implementation; and (2) Time Series models are evolutionary and, hence, self-learning and self-correcting. As described in greater detail below, the present invention provides a pricing analysis method that combines the benefits of both Econometric and Time Series modeling.

Returning to time series modeling, various types of Decomposition models are known. For example, an Additive Decomposition Model assumes that the components of a time series behave independently of each other. For example, regardless of an increasing trend, it is assumed that the amplitude of seasonal effect will always be the same from one year to another, as summarized in Equation 3 that assumes that demand at time t is merely a function of trend, seasonality, marketing instruments, and irregular effects at time t.

$$Q_t = T_t + S_t + MI_t + I_t \quad (\text{EQ. 3})$$

Alternatively, a Multiplicative Decomposition Model assumes that the amplitudes of seasonal, promotional and irregular terms are directly proportional to the level of trend. Most commonly observed series exhibit this behavior. A Multiplicative Decomposition Model is summarized in Equation 4.

$$Q_t = T_t \cdot S_t \cdot MI_t \cdot I_t \quad (\text{EQ. 4})$$

A Pseudo-Additive Decomposition Model combines the properties of both the additive and multiplicative models. The attractiveness of the multiplicative model is that the amplitudes of all effects are proportional to the underlying trend term. However, its limitation is that it does not effectively model cases where one of the raw observations is zero. To achieve both these properties, the present invention generally assumes that all terms are proportional in amplitude to trend but get applied in an additive sense (i.e., the present invention makes the irregular and seasonal factors independent of one another). For example, demand may be modeled as a provided in Equation 5:

$$Q_t = T_t + T_t(S_t-1) + T_t(MI_t-1) + T_t(I_t-1) \quad (\text{EQ. 5})$$

It should be noted that in the Pseudo-Additive Decomposition Model, all effects (seasonal, MI, etc.) are proportional to the underlying trend (since they enter in a multiplicative form). However, the application of the total effect is in an additive form. The advantage of this form is that if an observation is zero, then, in the multiplicative formulation, at least one of the terms will have to be zero to model that observation, whereas in the pseudo-additive formulation, the irregular component can be adapted so that the net effect is zero.

The two main philosophies for sales history decomposition are the model-based method and the filter-based method. The underlying notion is that sales data is made up of a range of cycles, including business cycles (the trend), seasonal cycles (seasonality), promotional cycles (MI) and noise (the irregular component). The Filter-based method applies a set of fixed filters (moving averages) to decompose the time series into a trend, seasonal, promotional, and irregular component, and a filter essentially removes or reduces the strength of certain cycles from the input data. In contrast, the model-based methods require the various components of the time series to be modeled separately and assume that the irregular component is "white noise" with zero mean and a constant variance where the various cycle lengths are equally represented.

Filter based methods are often known as X11 style methods. These include X11 (developed by U.S. Census Bureau), X11ARIMA (developed by Statistics Canada), and X12ARIMA (developed by U.S. Census Bureau). Computational differences between various methods in X11 family are chiefly the result of different techniques used at the ends of the time series. For example, some methods use asymmetric filters at the ends, while other methods extrapolate the time series and apply symmetric filters to the extended series.

Model based approaches allow for the stochastic properties (randomness) of the series under analysis, in the sense that they tailor the filter weights based on the nature of the series. The model's capability for accurately describing the behavior of the series can be evaluated, and statistical inferences for the estimates are available based on the assumption that the irregular component is white noise.

Filter based methods are less dependent on the stochastic properties of the time series. It is the time series analyst's responsibility to select the most appropriate filter from a limited collection for a particular series. It is not possible to perform rigorous checks on the adequacy of the implied model and exact measures of precision and statistical inference are not available. Therefore, a confidence interval cannot be built around the estimate.

As described above, filter-based methods may be used to decompose a time series. These methods filter out the trend, seasonal, and promotional effects out of a demand series. The basic idea is to remove the various types of cycles (monthly, quarterly, semi-annual, etc.) from the data. The trend is assumed to be smooth (and generally computed by using a moving average). The filter-based methods are generally iterative. First an estimate of the trend is computed. The de-trended data is then estimated for other effects. These effects are then removed from the original data to get a revised estimate of trend. The method iterates until convergence. The most commonly used filters applied to trend are moving average filters. Other types of filters, such as straight averages, transformations, differencing, linear regression, curve fitting are also known and used, albeit rarely.

The most common moving average filters assign unequal weights to various observations that are used to compute an average. For centrally located observations, far away from end-points, these weights are generally symmetric, but towards the ends, asymmetric weights are used. Some of the moving average most commonly employed are a simple moving average and the Henderson moving average (HMA).

The simple moving average is a filter that assigns equal weights to all "n" observations, or data points, that precede, coincide or follow the time period of interest. When the number of observations is even, then an average of two contiguous moving averages is used. This is termed as a centered moving average and the net weights assigned to individual observations may no longer be equal. For example, assume a time series comprising a sequence of events over eight time periods.

$Y_1, Y_2, Y_3, Y_4, Y_5, Y_6, Y_7, Y_8$

Then a three term simple moving average for period 3 is the average of the values for the period before, during and after period 3, or $$\frac{Y_2 + Y_3 + Y_4}{3}$$

Likewise, a two term centered moving average for period 3 is defined to be:

$$\frac{1}{2}\left(\frac{Y_2 + Y_3}{2} + \frac{Y_3 + Y_4}{2}\right), \text{ or } \frac{Y_2}{4} + \frac{Y_3}{2} + \frac{Y_4}{4}.$$

In the two term centered moving average, it can be seen that $Y_3$ gets half the weight and $Y_2, Y_4$ get a quarter each In contrast to the simple moving average, Henderson moving averages are built on the property that they can smoothly track cubic polynomials. These moving averages are attractive since they can adequately detect multiple trend turns and points of inflexion. Henderson moving averages are computed from data that is first adjusted for seasonality.

The HMAs do not put equal weight on all observations, however they are symmetric. In fact, weights are derived using the following two criteria:
(1) Minimizing the sum of squares of the third differences (smoothness criteria)
(2) Allowing polynomials up to degree three to be exactly reproduced The prime advantage of Henderson moving average is that the weights are independent of the underlying observations. This aspect allows comparison of results across several different time series. Consequently, HMAs are used within several methods employed by the US Bureau of Statistics.

In HMAs, the number of time periods ("n") used for computation must always be odd. When computing an HMA for time period "t", then the weight to be assigned to each time period can be computed as follows in Equation 6:

$$w_{t-r+i-1} = \{(r+1)^2 - i^2\}\{(r+2)^2 - i^2\}\{(r+3)^2 - i^2\}\{\beta_0 - \beta_1 i^2\} \quad \text{(EQ. 6)}$$

where $$r = \frac{n-1}{2}$$

$w_{t-r+i-1}$ is the weight to be assigned to period $t-r+i-1$
i ranges from 1 to n $$\beta_0 = \left(\frac{315}{8}\right)(3r^2 + 12r - 4)/A$$

$$\beta_1 = \left(\frac{3465}{8}\right)/A$$

$$A = 64r^9 + 1152r^8 + 8592r^7 + 34272r^6 + 78204r^5 + 99288r^4 + 57203r^3 - 4302r^2 - 19323r - 5670$$

Once the weights have been computed, then the HMA for a period t is as follows in Equation 7:

$$HMA(t) = \sum_{i=1}^{n} w_{t-r+i-1} \cdot Q_{t-r+i-1} \quad \text{(EQ. 7)}$$

Figure 3:
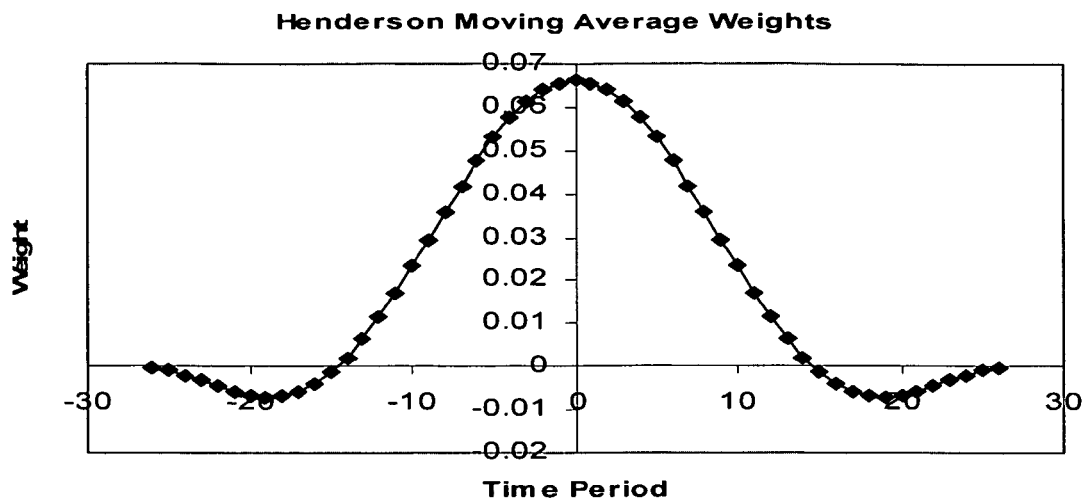
FIGS. 3-9 depict graphs summarizing the results from different moving average estimators in accordance with embodiments of the present invention.

For a 53-period Henderson Moving Average, the weight distribution is plotted in the HMA graph 300 in FIG. 3. It may be noted in HMA graph 300 that some weights may be negative.

Using a symmetric moving average results in what is commonly termed as an 'end-point problem'. This occurs because there is not enough data at the end points to be able to compute a symmetric moving average or other symmetric filter. As described above, a moving average relies on data points before and after a time period of interest, and a weighted average centered on the first term of the original series cannot be obtained as data before this point is not available. Similarly, it is not possible to calculate a weighted average centered on the last term of the series, as there is no data after this point. For this reason, symmetric filters cannot be used at either end of a series. This is known as the end point problem. Time series analysts can use asymmetric filters to produce smoothed estimates in these regions. In this case, the smoothed value is calculated 'off centre', with the average being determined using more data from one side of the point than the other according to what is available. Alternatively, modeling techniques may be used to extrapolate the time series and then apply symmetric filters to the extended series.

To overcome this problem, various know techniques compute asymmetric weights for the end points. Several methods have been advanced to compute asymmetric weights. For example, asymmetric end weights may be computed with properties similar to those of symmetric Henderson weights. The underlying idea of these weights is that as new data comes in, estimates of trend and seasonality must be revised minimally (i.e., estimates must be stable). This is called Minimum Revisions Criteria. The optimal end-weights can be computed as a function of the ratio of the mean absolute change in irregular component to the mean absolute change in the trend estimate, as described in Equation 8:

$$u_k = w_k + \frac{1}{m}\sum_{i=m+1}^{n} w_i + \frac{\left(r - \frac{m+1}{2}\right)\frac{\beta^2}{\sigma^2}}{1 + \frac{m(m-1)(m+1)}{12}\frac{\beta^2}{\sigma^2}} \sum_{i=m+1}^{n}\left(i - \frac{m+1}{2}\right)w_i \quad (EQ.\ 8)$$

where, n is the number of periods to be used to compute the moving average;

m is the number of periods available to compute an average (note that an asymmetric moving average is needed when m<n); and k is the index for which weight is being computed.

Similarly, the X11 procedure uses Musgrave asymmetric weights . . . with properties similar to those of Henderson weights. Musgrave's asymmetric weights have been empirically found to be comparable in accuracy to the case where the seasonally adjusted time series is first extrapolated by simple forecasting techniques and then using the original series along with its extrapolation within the symmetric Henderson moving average framework. Specifically, forecasting using a stepwise auto-regression provides results that are on average better than using asymmetric end-weights computed by Musgrave. An extrapolation using simple linear regression was also found to be quite comparable to the asymmetric filter.

Turning now to FIG. 1, the present invention provides a sales history decomposition method 100 to perform the Sales History Decomposition processing for sales records related to demand forecast units (DFUs). Generally for a given seller organization that operates as a seller or supplier, sales history decomposition is performed on a recurring basis for each item in each market. Since the demand for an item varies according to the market and time frame in which it is selling, demand forecasts according to the present invention are identified according to its DFU. A DFU according to the present invention is a mechanism for categorizing each demand forecast according to primary types of information. For example, each DFU may categorizes a forecast according to one of a plurality of a demand units, one of a plurality of demand groups, one of a plurality of locations, and one of a plurality of models. A demand unit is a unique product identifier code that functions in a manner similar to an item number or catalog number (i.e., it identifies the particular product to which that DFU's forecast will apply). Demand groups are categories into which demand units fall and which are used for forecasting purposes. A demand group, for example, might be a key account, a brand, a customer grouping or demographic, a vendor type, or a market zone. Therefore, each DFU contains a demand unit and a demand group into which the demand unit is further classified with other related demand units. Additionally, for each DFU, a location is specified which represents the geographic region to which a particular forecast will apply. Typically, the DFU location is specified at the market level and does not take distribution centers into consideration for a particular forecast. Finally, the model specified for each DFU defines the combination of history stream and forecast algorithm that will be used to create forecast for that particular DFU.

The use of DFUs to categorize and organize forecasts according to embodiments of the present invention allows users to correlate and associate related forecasts for a particular product (demand unit), for particular products within a given product category (demand group), for like products being sold to a particular type of customer (demand group), for a product or like products within a given market (location), or for a particular product within a particular market wherein different a forecast algorithm and history stream combination (model) is employed.

Raw data will be at the lowest level of granularity, such as DFU/time. The sales history decomposition method 100 removes the trend and seasonality effects from the raw data. In traditional demand models, trend is generally not modeled and seasonality is modeled as binary seasonality indicators. The present invention assumes that trend and seasonality effects are uniform over a group of products and markets; hence the decomposition analysis will be done at the aggregate level. Once trend and seasonality effects have been captured, they will be removed in a consistent manner from each constituent DFU.

Retuning to FIG. 1, the sales history decomposition method 100 takes raw sales data 101 that are collected and stored using known techniques, as described in greater detail below. Various mappings are defined in the raw sales data 101 in step 110. Specifically, a mapping is defined from DFU to DFUGroup. This assignment defines a mapping of granular entities that are hypothesized to have similar trend and seasonal effects to an aggregate level. In the present invention, this mapping is called a decomposition group.

In the definition mapping step 110, a subset of DFUs from this mapping to be used as a representative of the entire set of the raw sales data may also be selected. This subset may be used for analysis of trend and seasonality, and from this point onwards, all analysis may be at this sub-set level in order to minimize processing resources.

The motivation to split the definitions of a logical group of DFUs that have similar trends and seasonality from the group that will actually be used to identify trend and seasonality is because not all DFUs may have a rich sales history over the entire historical span of data used for analysis. For example, assume that there are ten stores in California that are hypothesized to have similar trend and seasonal effects, however the last one was opened just six months back. Hence, rather than accounting for the sudden surge in demand due to an additional store mid-way through the historical data, a user may want to exclude the store from historical analysis, estimate trend and seasonality estimates using the remaining nine stores and propagate these estimates directly to the tenth store.

Thus, the DFU—Decomposition Group & Sub-Group Map will most likely be driven by client business intuition and product/account hierarchies. Basically, the goal is to identify a set of DFUs which are driven by the same market factors in terms of trends and seasonality. For B2C industries, a functionally homogenous group of products (such as a product-category or product-class) may be most likely candidates. In the store dimension, the goal is to identify homogenous stores, ex. all stores in a state or in a country. For B2B type industries, it may help to group products based on the consuming industry vertical. Each industry vertical has its own business cycles which will likely affect the consumption of products serving that industry. Ex. In Online Media Advertising, DFUs (i.e., advertising spaces) may be segmented into Finance ad spaces, Technology ad pages, etc. since the former will be mostly consumed by the Finance vertical and the latter by the Technology vertical.

There will always be a trade-off between homogeneity and density. The larger the group, the more the density of transactions, but more the likely heterogeneity between DFUs (see next section on the case describing the implications of grouping heterogeneous products), and ideally a balance is reached. Since the decoupling algorithm depends on homogeneity in both trends/seasonalities and price sensitivities, it may not be possible to define a group that has all the desired properties. To circumvent some issues with heterogeneity in prices and price sensitivities, the present invention may provide the ability to define sub-groups of DFUs. For example, if the Decomposition Group is defined as a class of products (ex. Big Screen TVs), then a user may choose to assign them to (say) three Sub-Groups: Low Priced, Medium Priced and High Priced Big Screen TVs. Another example may be to define Decomposition Group as a category of products, and then defining sub-groups as national brands, regional brands and local/store brands.

A DFU may optionally include a "Use for Analysis Parameter," a binary parameter that flags whether the DFU may or may not be used for analysis. Since the decomposition logic aggregates DFU level sales to Group level sales, the algorithm will work best if the composition of a Group remains constant over time. However, for some Categories (ex. laptop computers), products transition in and out of market very rapidly. In such cases, the growth or fall in sales at the Group level may be due to a product transition effect rather than a trend or seasonality effect. For example, candies come in many more colors and packages around holiday season than regular season. Hence, a spike in sales around holiday season is partially due to many more products being offered in the category and partially due to holiday seasonality effect. In such cases, the best approach may be to ignore the new colors launched during Holiday season completely from analysis.

It is recommended that products that exist over a much shorter horizon than the decoupling sales history may not be used for analysis within Decomposition. An optimal way to think about using a DFU within analysis to evaluate if including the DFU will do more benefit (i.e., contribute useful trend and seasonality information) or do more harm (i.e., distort the Group level sales levels to an extent that sales changes due to DFU inclusion are misinterpreted as a trend or seasonality signal).

Since the present invention is aggregating prices across DFUs to the Sub-Group level, it may be advantageous that price ratios optionally are aggregated rather than absolute prices. However, the definition of a price ratio requires a meaningful denominator. It is generally assumed in marketing literature that consumers do not react directly to the observed price levels, but to the difference between the observed prices and some internally perceived fair price. The most widely used price for denominator is the shelf price (or the list price) of the DFU. However, the list price may be too static and, in some cases, completely irrelevant to the consumer's buying decision process. In such cases, an exponentially smoothed average of historical observed prices can be computed. This can be interpreted as a case where a consumer forms and updates his internal reference price by observing offered prices.

Besides the mapping, the user will also need to define the decomposition time calendar required in time slotting in step 120. In the time slotting step 120, various constants and variables factors are defined and associated with the various time periods of interest, as needed to perform subsequent sales history decomposition steps from the sales history decomposition method 100. Typically, as pre-processing steps prior to running decomposition, List (or Base) Prices, Effective Prices, Sales Quantities, Marketing Instruments and Normalizing Factors are computed for all the DFUs in the Decomposition Group defined in step 110 and time slotted using a particular calendar, which should cover the whole length of the decomposition time calendar. Reference prices may also be computed in step 120, such as through exponential smoothing, and time slotted using a particular calendar, which should cover the whole length of the decomposition time calendar. Furthermore, in time slotting step 120, time slotting according to the decomposition time calendar is performed on DFU-level List Price, Effective Price, Reference Price, Sales Quantity, Marketing Instruments, Business Incentive Instruments and Normalizing Factors.

In one embodiment of the present invention, the time slotting step 120 entails computing a reference price for each DFU/time. A reference price is defined as a price that a consumer uses as a reference point while evaluating the offered price before making a purchase. The simplest and the most commonly used value is the list price (aka shelf price, regular price, etc.). However, the list price may be too static and, in some cases, completely irrelevant to the consumer's buying decision process. In such cases, an exponentially smoothed value of $p_{it}$ such as $p_{Oit}$ for each DFU is computed, using an appropriate smoothing weight and use this as a proxy for reference price. An exponentially smoothed average can be interpreted as a case where a consumer forms and updates his internal reference price by observing offered prices. Optionally competitor prices may be factored in the computation of a consumer's reference price. Thus $p_{Oit}$ can be imagined as what the consumer would have expected the price to be based on his previous purchase experiences and the current observed price. Empirical studies in Marketing Science have suggested that consumers in retail grocery purchases recall up to four to five past purchase occasions. From that standpoint, the smoothing weight must depend upon the Decomposition Group under question. If the group is a fast moving category, such as milk, then smoothing weight must be high since the purchase frequency is much higher. However, for a category such as detergents that tend to stay in inventory for longer periods, smoothing weight must be low since the reference price formation will likely span over a much longer time span. For categories where prices are highly dynamic, such as consumer electronics, a consumer may purchases very infrequently, but he will likely shop/research for an extended period, such as a few weeks, prior to making a purchase. In such cases, a smoothing weight may put most weight on the past few weeks. In some businesses, however, where purchase frequency is low and consumers do not form regular buying habits, the list price may be a valid representation of reference price. Since list price are much easier to interpret and also directly observable, they must be used as opposed to an exponentially smoothed value.

Time slotting step 120 may also optionally entail insuring measure equivalence. Since, as described below, the next step of the sales history decomposition method 100 is aggregated across multiple prices and quantities in step 130, described below, prices should be transformed to a consistent basis of measurement (e.g., price per oz., price per serving, etc.). Likewise the quantity must be modified to a consistent unit of measure (e.g., number of ounces, number of servings, etc.). An "equivalent_units" factor will be provided by the analyst along with each DFU in order to perform this operation.

With the optional expediential smoothing, at the end of the time slotting step 120, the following variables are defined—

$p_{it}$—Average price for DFU i in time bucket t $$p_{it} = \frac{\sum_{s \in t} P_{is} Q_{is}}{\sum_{s \in t} Q_{is}}$$

Here t is an aggregated time bucket whereas s may be a granular time period depending upon the level at which client data is obtained.

$P_{is}$=Effective Price for DFU i at time period s.

$Q_{is}$=Unit Sales for DFU i at time period s

Note that if the data feed is at the level of transaction data, then prices and quantities must be aggregated over all transactions and time periods (s) up to time bucket (t)

$\tilde{p}_{it}$—Normalized Effective Price for PAC i at time bucket t $$\tilde{p}_{it} = \frac{p_{it}}{\text{Equivalent } Units_i}$$

$\tilde{p}_{O_{it}}$—Normalized (exponentially smoothed) Reference price or List price depending on analyst preference If $\tilde{p}_{O_{it}}$ is an aggregated List price, then it must be computed in a manner consistent with $p_{it}$ If $\tilde{p}_{O_{it}}$ is a reference price, then it must be computed as follows:

$$\tilde{p}_{O_{it}} = \frac{\sum_{h=t}^{h=1} \tilde{p}_{it} \cdot \alpha(1-\alpha)^{t-h} I_{ih}}{\sum_{h=t}^{h=1} \alpha(1-\alpha)^{t-h} I_{ih}}$$

Where,
i is an index of DFU
h is an index of time-bucket
t is today (or current time-bucket)
α is the smoothing weight $I_{ih}$ is a binary indicator variable indicating if a price was observed in a particular time period or not. i.e.

$$I_{ih} = \begin{cases} 1; \text{if } p_{ih} \text{ exists} \\ 0; \text{otherwise} \end{cases}$$

Note that for periods where $I_{ih}=0$, $\tilde{p}_{O_{it}}$ need not be computed $q_{it}$—Total quantity for DFU i at time bucket t $$q_{it} = \sum_{s \in t} Q_{is}$$

$\tilde{q}_{it}$-Normalized quantity for PAC i at time bucket t
$\tilde{q}_{it} = q_{it} \cdot (\text{Equivalent Units})_i$ Returning now to FIG. 1, the sales history decomposition method 100 continues with aggregation step 130 in which required variables are aggregated up to the Decompose Group level. The time level of granularity (i.e., time calendar) is generally consistent with the time level defined in time slotting step 120. The Aggregation Technique defines the method of aggregating prices, marketing instruments and quantities across different DFUs to the Sub-Group/Group level. Unfortunately, there is no good answer to the selection of a particular aggregation method, and the solution will most likely depend upon empirical analysis and intuition.

The issue of aggregation over non-uniform entities has often been questioned both in theory and practice. The present invention recognize that there will be confounding effects by aggregating over prices and quantities that are not of the same consistent level (ex. aggregating over national brands and store brands, or CRT TVs and Plasma TVs). The present invention mitigates some of these effects by aggregating price ratios (rather than actual prices). As possible alternatives, the present invention may either choose weights proportional to unit sales, or the present invention can use the Stone-Price Index that has often been in economics for demand analysis at an aggregate level. The Stone-Price Index uses a revenue-share of each entity as a weighting function. Optionally, the present invention may employ a known variant of the Stone-Price Index that use a constant long-term historical revenue-share rather than a time-varying revenue share. In this way, the present invention can alleviate concerns of endogeniety of price. Another known alternative is a quantity share-weighted geometric mean of price, which is equivalent to the exponent of a quantity weighted average of log prices. This index is called the Divisia Price Index and is often used within the AIDS Demand Model.

For sales volume, the issue with aggregation is slightly different. The simplest way of aggregating volume is to simply add up the equivalent sales volume. However, in Decomposition Groups where new products are introduced over time, simple addition may result in a possible perception that Decomposition Group level sales are rising over time due to a positive trend, when the reality is that the rise due to introducing more products. In such cases, it may make sense to take an average across equivalent quantity ratios.

Optionally in aggregation step 130, a user may choose the desired level of aggregation of price and other marketing instruments. This way, the user, or analyst, can define several homogenous DFU groups within a single Decomposition Group. The present invention will call this groups as Decomposition Sub Groups. Aggregate price and marketing instrument variables ($P_{tS}$, $MI_{tS}$) for each Sub Group (S, say) will be created and subsequently used in the demand regression in step 160, discussed below. Note that for quantity, the level of aggregation will generally be the Decomposition Group.

Types of price/MI aggregation techniques and types of Quantity Aggregation techniques that may be used within the present invention for Price/Marketing Instruments include: (1) Volume Weighted Arithmetic Average; (2) Revenue Weighted Arithmetic Average; and (3) Volume Share Weighted Geometric Average.

Volume-Share Weighted Average is the most widely used and the most intuitive average, since it has the interpretation of "Total Dollars Spend/Total Units Purchased", thereby providing the resultant average price of each unit. Its disadvantage is that it will too skewed towards the prices of DFUs that have high sales volume levels. In the Volume Weighted Arithmetic Average, price is aggregated according to Equation 9:

$$P_{St} = \frac{\sum_{i \in S} \tilde{q}_{it} \cdot \frac{\tilde{p}_{it}}{\tilde{p}_{oit}}}{\sum_{i \in S} \tilde{q}_{it}} \quad \text{(EQ. 9)}$$

Marketing Instruments (as many as are relevant to the business) are aggregated according to Equation 10:

$$MI_{St} = \frac{\sum_{i \in S} \tilde{q}_{it} \cdot MI_{it}}{\sum_{i \in S} \tilde{q}_{it}} \quad \text{(EQ. 10)}$$

Revenue-Share Weighted Average may be advantageous since the present invention may be aggregating across disparate DFUs (ex. Big Screen TVs and TV-VCR Combos), and thus, sales volume and price levels will most likely be very different across different DFUs. Intuitively, the amount of weight the present invention want to place on each DFU's price must be equivalent to what the perceived importance of the DFU is to the consumer. Under loose assumptions, it can be imagined that the importance of a DFU is directly proportional to the amount that a consumer must spend to purchase it. Hence Revenue-Share weighted averages have the interpretation of an average that is weighted by the relative importance of the DFU to the consumer. In the Revenue Weighted Arithmetic Average, price is aggregated according to Equation 11:

$$P_{St} = \frac{\sum_{i \in S} \tilde{p}_{it} \tilde{q}_{it} \cdot \frac{\tilde{p}_{it}}{\tilde{p}_{oit}}}{\sum_{i \in S} \tilde{p}_{it} \tilde{q}_{it}} \quad \text{(EQ. 11)}$$

Marketing Instruments (as many as are relevant to the business) are then aggregated according to Equation 12:

$$MI_{St} = \frac{\sum_{i \in S} \tilde{p}_{it} \tilde{q}_{it} \cdot MI_{it}}{\sum_{i \in S} \tilde{p}_{it} \tilde{q}_{it}} \quad \text{(EQ. 12)}$$

Volume-Share Weighted Geometric Average has slightly different properties from Arithmetic averages in the sense that they are more sensitive to changes in its constituent elements that are smaller in magnitude (<1) and less sensitive to changes in values of elements that are larger in magnitude (>1). Consumers may react more strongly to a category if one or more of its products had a large discount on it (i.e., price ratio <<1), as opposed to a case where a product is priced at a much larger premium (i.e., price ratio >>1). In the Volume Share Weighted Geometric Average Revenue, price is aggregated according to Equation 13:

$$P_{St} = \exp\left(\frac{\sum_{i \in S} \tilde{q}_{it} \cdot \log\left(\frac{\tilde{p}_{it}}{\tilde{p}_{oit}}\right)}{\sum_{i \in S} \tilde{q}_{it}}\right) \quad \text{(EQ. 13)}$$

Marketing Instruments (as many as are relevant to the business) are then aggregated according to Equation 14:

$$MI_{St} = \exp\left(\frac{\sum_{i \in S} \tilde{q}_{it} \cdot \log(MI_{it})}{\sum_{i \in S} \tilde{q}_{it}}\right). \quad \text{(EQ. 14)}$$

A pragmatic benefit of the Volume-Share Weighted Geometric Averages is that they are linear in logs and hence work well within a calibration where the functional form is log-log type, as described below in the regression step 160. It must be noted that this aggregation technique will not work for cases where one of its elements can take a value of zero, ex Marketing Instruments are typically binary variables and hence this method aggregation must not be used to aggregate MIs. It is recommended that unless there is a strong reason to evaluate various alternatives, the user choose Volume-Share Weighted Average as default.

Similarly, types of quantity aggregation techniques supported by the present invention may include: (1) Straight Summation; and (2) Average Ratio. In Straight Summation, demand is aggregated as defined in Equation 15:

$$Q_t = \sum_i \tilde{q}_{it}. \quad \text{(EQ. 15)}$$

This is the most intuitive means of aggregation where the category level sales are a simple summation of DFU level sales. It works best when all DFUs are offered for sale at (almost) all times. It is recommended for Decomposition groups where DFU transition effects are minimal and all (in fact, most) DFUs used for analysis are active over the history of analysis.

In Average Ratio, demand is aggregated as defined in Equation 16:

$$\text{Demand:} Q_t = \frac{1}{\# \ DFUs \ \text{in Time Period } t} \sum_i \frac{\tilde{q}_{it}}{\sum_h \tilde{q}_{ih} / \# \ \text{Time Periods for } DFUi} \quad \text{(EQ. 16)}$$

If a Decomposition Group contains DFUs that may be introduced much after the start of the Decomposition Analysis Horizon, adding sales of DFUs directly may create a sudden rise in sales mid-way through the horizon that may be incorrectly attributed to a rising trend. A possible method of handling this is to use an external driver variable (say, number of DFUs offered for sales) in the regression. However, the rise in sales will be dependent on the sales levels of the new DFU and hence cannot be easily modeled by a single variable such as number of DFUs.

In such cases, the present invention can aggregate sales by first normalizing the sales of each DFU/time-period, as described above, and then taking the average across these. In this way, the present invention will avoid sudden jumps/falls in sales due to an NPI/EOL effect. The disadvantage of this method is that the sales are normalized by dividing by the average sales level of each DFU which, due to the fact that different DFUs are offered over different time-periods, are not computed in a consistent manner across DFUs. Thus, it may be generally preferable for users to use the average of quality ratios for those Groups where product transition occurrences are high and such high-transition DFUs cannot be ignored for analysis.

However, if the trend and seasonality effects are highly dynamic across the decomposition horizon, then neither method of aggregation may work well. In such cases, it is strongly recommended that either the decomposition horizon be shortened or the Decomposition Group definition be reconsidered.

Referring again to FIG. 1, the next step in the sales history decomposition method 100 is to form an initial trend estimate in step 140. In a preferred implementation, the initial trend estimate is formed in step 140 by compute an n-week (most likely 52-week) moving average of $Q_t$.

The centered moving average puts $$\frac{1}{n}$$

weight on each of the $$\frac{n}{2} - 1$$

time periods preceding, the focal period itself and the $$\frac{n}{2} - 1$$

time periods following time period (t) when n is odd, and puts $$\frac{1}{2n}$$

weight on each of the two end-periods (i.e., period $$\left(\text{i.e., period } t - \frac{n}{2} \text{ and } t + \frac{n}{2}\right) \text{ and } \frac{1}{n}$$

weight on all other time periods when n is even. Mathematically, this is equivalent to $$T_t^0 = \frac{1}{n}\sum_{i=t-r+1}^{i=t+r-1} Q_i + \frac{1}{2n}\{Q_{t-r} + Q_{t+r}\} \text{ where } r = \frac{n}{2}$$

and n is even; and $$T_t^0 = \frac{1}{n}\sum_{i=t-r}^{i=t+r} Q_i \text{ where } r = \frac{n-1}{2}$$

and n is odd.

The motivation to use a 52-week average is so that seasonal effects do not pollute the initial and subsequent trend estimates. However, the present invention may have price and promotional effects confounding the trend estimates of step 140.

As described above, a moving average of $Q_t$ made be calculated using Simple Moving Average or Henderson Moving Average. In either of these moving averages, the user must select a Number of Periods to be considered. The number of periods define the sensitivity of the moving average to fluctuations and noise in sales data—hence a poor choice of parameters can misrepresent the trend estimate.

With the Simple Moving Average, for almost all cases, it was found that the estimate of Initial Trend was irrelevant to the final results; if a substantial number of iterations are performed. The goodness of the Initial Trend Estimate determines the number of iterations it takes to converge, but does not necessarily affect the final quality of results, but this is not true for some outlier cases. This is a fortunate property since it implies that the users can use simple heuristics to set up parameters for initial trend estimate. Note that the goal of this moving average is to filter (or dampen) price, promotional and seasonality cycles out of the raw data. It is unlikely that prices and marketing instruments have any particular season beyond that of the underlying seasonality. Since the present invention wants to dampen seasonality, the recommendation is to set the parameter equal to the number of time periods in a season cycle. i.e., If a time bucket is a week and there is annual seasonality in the data, then set the parameter equal to 52; and if there is quarterly seasonality, then set it to 13.

Figure 4:
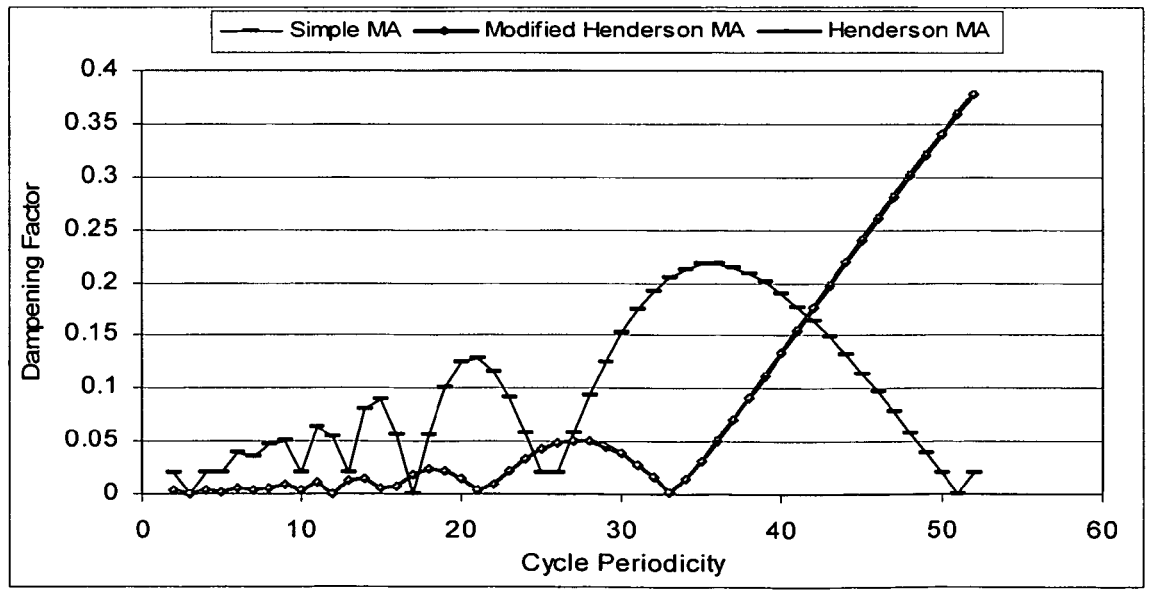

These recommendations are based on the fact that for a symmetric moving average of length 2m+1, the dampening function can be computed as:

$$D(\omega) = \left|w_0 + 2\sum_{k=1}^{k=m} w_k \cos(\omega k)\right|$$

$$\omega = \text{Cycle Frequency} = \frac{2\pi}{p};$$

where p is the number of periods in the cycle $w_k$=weight assigned to the point "k" time-periods away A 51 week moving average affects graph 400 in FIG. 4 provide a quick reference to how a 52-period and 13-period moving average affects different types of periodic cycles. Dampening Factor implies the result amplitude of a cycle of certain periodicity and an amplitude equal to 1. ex. A Dampening Factor on 0.4 implies that the amplitude is reduced from 1 to 0.4 by applying a particular moving average. As depicted in the 51 week moving average affects graph 400, a 51-week Simple Moving Average completely removes a 51-period cycle and also removes all cycles that are perfect divisors of 51 (ex. 17, 3, etc.).

Figure 5:
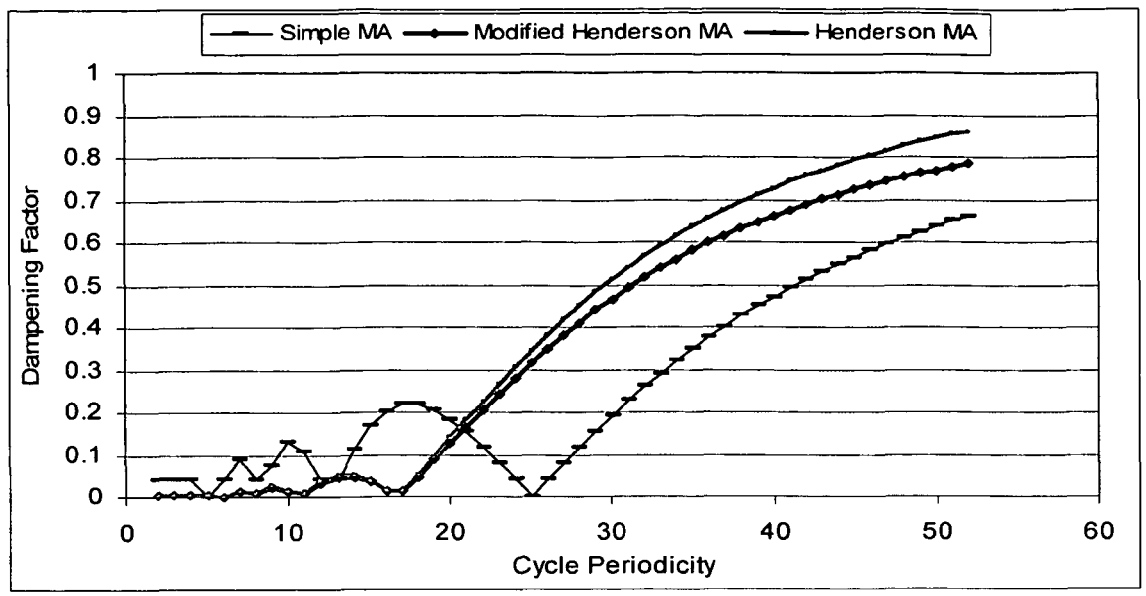

Likewise, as depicted in a 25 week moving average affects graph 500 in FIG. 5 a quick 25-period Simple Moving Average removes all cycles with periodicity 5 and 25. Also cycles with a periodicity higher than 25 gradually approach a dampening factor of 1, implying that such cycles will not dampened.

The Henderson Moving Average may be used in trend estimation step 140 to estimate trend, once price, marketing instruments, seasonality (and any other causal factor effects) have been removed. In time-series analysis, it is common to model any time series as a combination of several harmonic terms (of different periodicity). The terms with low periodicity typically model noise and the ones with larger periods model seasonality or business cycle effects. The Henderson Moving Average smoothes dampens low period cycles and leaves larger period cycles un-damped. Depending upon how noisy the data, an appropriate number of periods Henderson Moving Average must be used.

Figure 6:
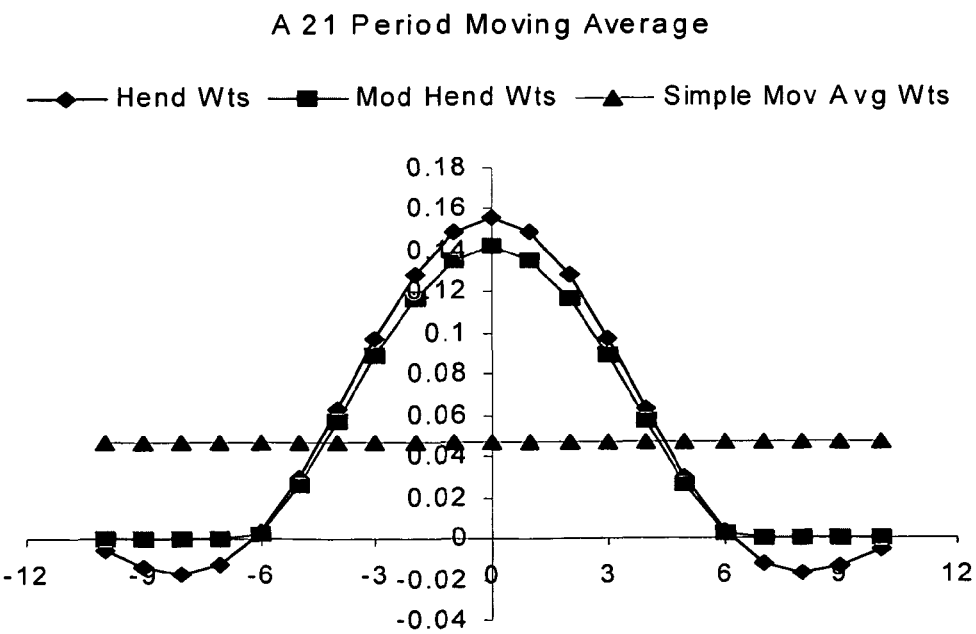

A 21 period moving average graph 600 in FIG. 6 displays the weight distribution of this moving average. A disadvantage of this moving average is that, since some weights are negative, the smoothed value of moving average at a particular time period may become negative. Negative values cause instability and the algorithm oscillates rather than converging. The present invention circumvents this problem by creating a Modified Henderson Moving Average (MHMA). This moving average will always assign positive weights to all time periods.

It can be observed in FIG. 6, that the dampening properties of the Modified Henderson Moving Average are very similar for a larger period MA and slightly inferior to a Henderson Moving Average for smaller period MA. However, they are both much better than a simple Moving Average. In empirical tests, both Henderson and Modified Henderson MA yielded comparable results.

Since the MHMA is applied to Decomposition Group level sales data after price, marketing instruments and seasonality effects are removed, the choice of the number of periods to be used for MHMA depends upon how noisy this series is. This series is computed and updated iteratively within the algorithm and is not readily available to the user. It is generally found that the parameter could be initially set by inspecting the Raw Sales aggregated to the Decomposition Group level and later updated if the de-price/marketing instruments/seasonality series produced as a result of this parameter is found to have different noise characteristics from the raw series.

In order to determine the different type of cycles present in a time series, i.e., to perform frequency domain analysis, spectral density graphs can be created and viewed. Several commercially available statistical software packages have ready routines to create such graphs.

For example, consider the following time series which has been generated as a summation of four harmonics as follows:

$$Y_t = 3\left\{\cos\left(\frac{2\pi t}{10}\right) + \sin\left(\frac{2\pi t}{10}\right)\right\} + 1\left\{\cos\left(\frac{2\pi t}{2}\right) + \sin\left(\frac{2\pi t}{2}\right)\right\} +$$
$$2\left\{\cos\left(\frac{2\pi t}{14}\right) + \sin\left(\frac{2\pi t}{4}\right)\right\} + 1\left\{\cos\left(\frac{2\pi t}{4}\right) + \sin\left(\frac{2\pi t}{4}\right)\right\}$$

Figure 7:
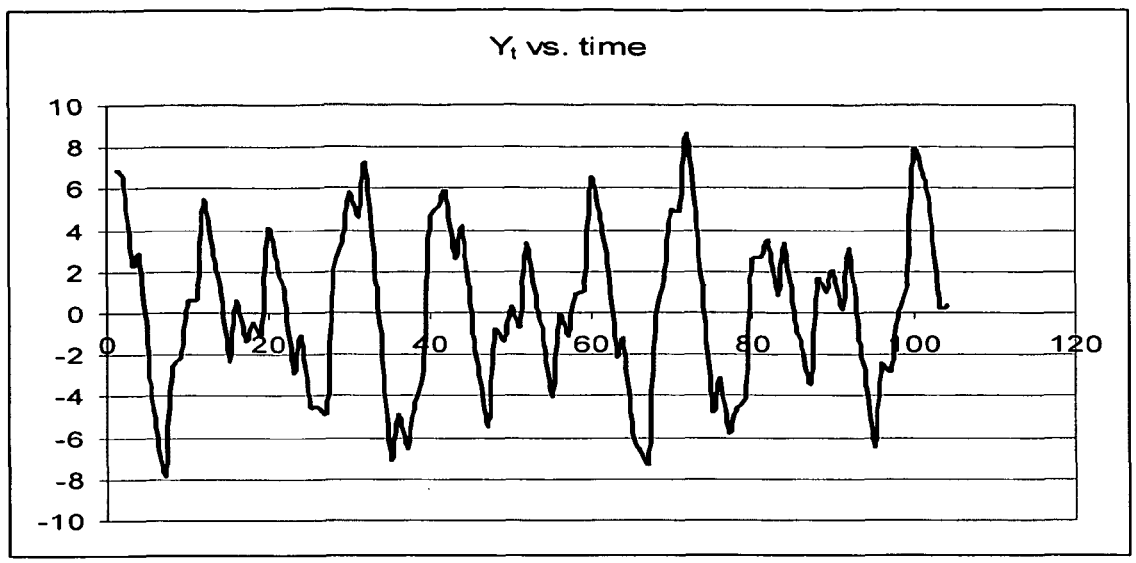

The corresponding time series plot 700 is depicted in FIG. 7. Though not immediately obvious from the time series plot 700, the generating equation above shows that there are at least four cycles in the above chart of periodicity 2, 4, 10 and 14.

Figure 8:
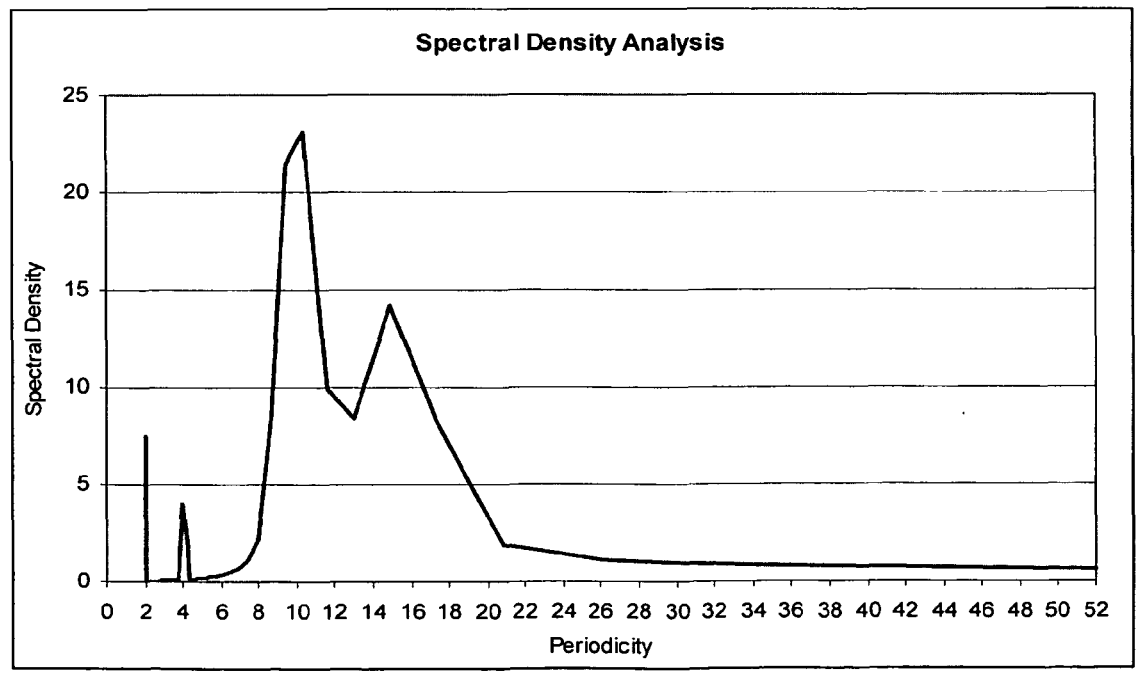
Figure 9:
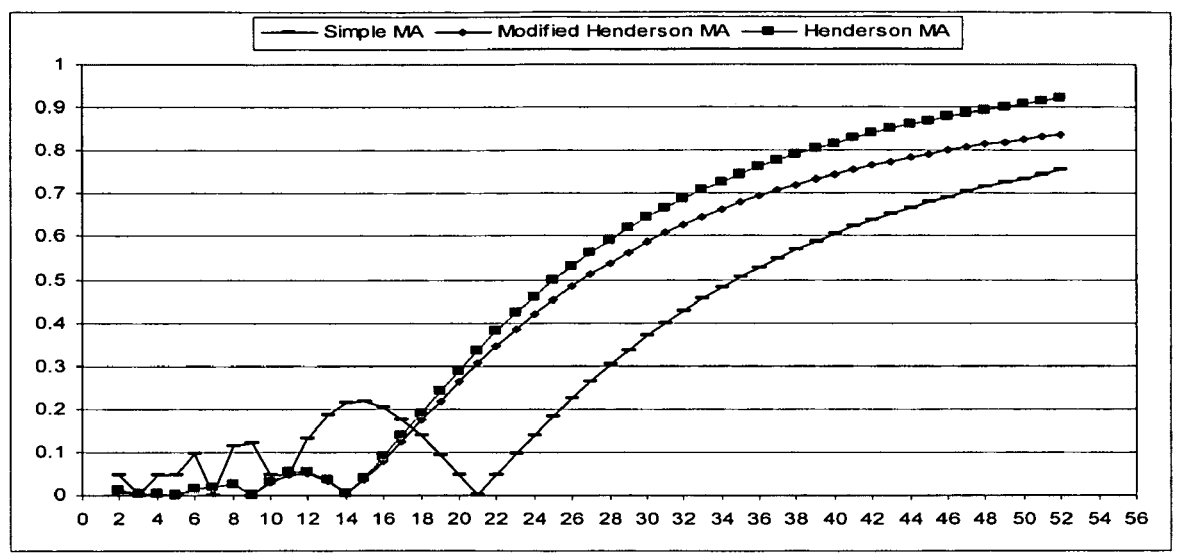

Similarly, a spectral density chart 800 of the above series is depicted in FIG. 8.: The spectral density graph 800 shows peaks at periods 2, 4, 10 and 14; consistent with the generating function. Now, if the user determines that all cycles were due to noise, she could choose an MHMA with an appropriate number of periods to dampen these cycles. As depicted in the second 21 period moving average graph 900 in FIG. 9, a 21-period MHMA will dampen all cycles with periods 2, 4 and 14 completely and substantially dampen cycles with periods 10. Hence, a 21-period MHMA may be the most appropriate filter for the exemplary time series of FIG. 7.

Continuing with trend estimation step 140, since the present invention uses a moving average, an estimate of trend generally cannot be made for the first "r" time-periods and the last "r" time-periods of the history. This results in some loss of sales history, but this information is recovered in later steps of the sales history decomposition method 100, as described below.

The formation of an initial trend estimate can be optionally bypassed, if needed. For example, a user can manually provide an initial trend estimate that is prepared using various know techniques and tools. In empirical analysis, it has been determined that a bad initial estimate (most likely due to substantial new product introductions leading to category growth over time), the sales history decomposition method 100 may produced undesirably inaccurate results. In such cases, if the user wishes to turn off the initial trend estimate of step 140.

Within the decomposition step 140, Life Cycle Effects may also optionally be estimated as well according to known methods and tools.

Referring again to FIG. 1, the next task in the sales history decomposition method 100 is to compute De-Trended Sales History using the initial trend estimate from step 130, step 150. The de-trended sales history may be computed using Equation 17:

$$Q_t^{0\prime} = \frac{Q_t}{T_t^0}. \tag{EQ. 17}$$

$Q^{0\prime}_t$ will thus be computed for all time periods except for the first "r" time-periods and the last "r" time-periods of the sales history. If the Initial Trend Computation of step 130 is skipped, as described above due to poor initial estimate, then $Q^{0\prime}_t = Q_t$ for the first iteration.

Continuing with FIG. 1, the sales history decomposition method 100, continues with the De-Trended Sales History $Q^{0\prime}_t$ from step 150 being regressed as a function of Price, Marketing Instruments and Seasonality Terms, step 160. Various regression formulation are known and is generally configurable by a user. For generality, it may be convenient and advantageous to assume for generality that the regression step generally uses a functional form as contained in Equation 18:

$$g(Q^{0\prime}_t) = f(\alpha, P_{St}, MI_{jSt}, n_{Gt}, I_{tk}) \tag{EQ. 18}$$

where $f(\alpha, P_{St}, MI_{jSt}, n_{Gt}, I_{tk})$ is linear in parameters. Since the first and the last "r" time-periods for $Q^{0\prime}_t$, the regression of step 160 generally does not include these time-periods Preferably, the left-hand side of the above formulation of for the regression in step 160 is in the form of $\log(Q^{0\prime}_t)$ to preserve the multiplicative nature of trend and seasonality in linear regressions. Thus, one possible for the regression may be a Log-Log formulation, such as in Equation 19:

$$Log(Q_t^{0\prime}) = \alpha + \sum_S \left\{ \beta_S Log(P_{St}) + \sum_j \eta_{jS} MI_{jSt} \right\} + \sum_G \phi_G Log(n_{Gt}) + \sum_k \delta_k I_{tk} + \varepsilon_t \qquad (EQ.\ 19)$$

where, S denotes the index of a SubGroup and G denotes an index for any external driver, and $I_{tk}$ is defined as 1 if the period t is in season k, 0 otherwise.

Seasonality, may be modeled it as either binary indicator variables as is the case in the above equation 19, or the present invention could model it as a collection of Fourier terms. In general, t should be appreciated that other known techniques would regression formulations with other terms, such as Fourier terms. The log-log transformation, as contained in Equation 19, has the advantage that price and promotional coefficients can be interpreted as elasticities. Also, it has the advantageous property of rendering a non-stationary time series as stationary.

An example of external driver ($n_{Gt}$) may be the number of entities in the Decomposition Group that are being offered for sale at time t. The entity may represent anything that the analyst feels is relevant to modeling demand. An example could be the number of products available on the shelf for sale, and this would account for any NPI/EOL (new product introduction/end of lifecycle) effects on Decomposition Group level sales growth or decline. Another example could be the number of mature products on sale at the time, to capture the effect of specific life cycle stages of products on Decomposition Group level demand.

In step regression step 160, a user specifies a functional form for the regression. There are two parts to this decision—the mathematical formulation of the regression; and the driver/predictor variables to be included in the regression.

As such, the choice of the mathematical formulation for regression is not based on any strong rules. The general idea is to choose what fits best. As a practical recommendation, though, it is best to stick to a log-log model to the extent possible. The advantage is that a log transformation makes the dependent variable close to stationary; seasonality effects can be interpreted as a multiplicative adjustment; and the formulation is known to work very well in marketing science literature. However, if a user must use another model, then a semi-log model may be experimented with provided the left-hand side is log(Q0't) if seasonality is being modeled.

As for the selection of the Driver/Predictor Variables, a Decomposition Group level model is generally used in the present invention, and the goal is not to estimate elasticities. Hence the model does not have to be very precise. The general recommendation is to use approximately 52 weeks of history aggregated to weekly level. Hence, the total number of data points available for regression will be 52, which limits the number of predictor variables that can be added to the regression. Preferably, at most 6-8 predictor variables are added to the regression. As with any regression, the idea is to include as many predictor variables as are necessary to explain the variation in dependent variable. However, the following are some variables that must be considered:

Price Ratio for each sub-group

Relevant marketing instruments for each sub-group

Binary Indicator variables/Fourier terms for seasonality

Any External Driver Variables (i.e., normalizing factors) such as:

Number of DFUs (or number of products) being offered at the time

If Life cycles issues are prominent, then Number of "Mature" DFUs being offered at the time or (say0 the number of new DFUs launched at the time Also note, that since the goal is to explain Group Level sales, cross-elasticities at sub-group level are not relevant. However, cross-elasticities across Groups (or between a Group and a sub-group belonging to another Group) may be relevant and could be included if found important.

Using the coefficients from the regression analysis from step 160, seasonal, price, and MI cyclical effects are removed from the original demand series, or raw data 101, in step 170. Optionally, removal of selected effects in step 170 may entail using only those coefficients that are significant above a certain desired amount. In other words, insubstantial seasonal, price, or MI effects may be ignored.

In the removal of seasonal, price, and MI effects in step 170, the equation to are generally the inverse of the function used in the regression analysis step 160, according to the selections made by the user. The specification of equation to be used in step 170 generally has the form of equation 20:

$$Q_t^{0\prime\prime} = \frac{Q_t}{g^{-1}(f(\alpha, P_{St}, MI_{jSt}, n_{Gt}, I_{tk})) * SF} \qquad (EQ.\ 20)$$

A user employing a log-log formulation, as provided in Equation 19, may then use an inverse formation as provided in Equation 21:

$$Q_t^{0\prime\prime} = \frac{Q_t}{\exp(\alpha) \cdot \prod_S \left\{ P_{St}^{\beta_S} \exp\left\{ \sum_j \eta_{jS} MI_{jSt} \right\} \right\}} \cdot \frac{1}{\exp\left\{ \sum_k \delta_k I_{kt} \right\} \cdot \prod_G n_{Gt}^{\phi_G} \cdot SF} \qquad (EQ.\ 21)$$

Generally, all the time-periods of $Q_t$ are used in detrending step 170, so $Q^{0\prime\prime}_t$ is determined for all the time-periods. The left hand side of may be used as $Q^{0\prime}_t$ for cases where seasonality is not being modeled (i.e., assuming seasonality=1).

In the above Equations 20 and 21, SF is the Smearing Factor. This is computed as follows in Equation 22:

$$SF = \begin{cases} 1; \text{if } g^{-1}(x) = x \\ \frac{\sum_t Q_t^{0\prime}}{\sum_t g^{-1}(f(\alpha, P_{St}, MI_{jSt}, n_{Gt}, I_{tk}))}; \text{otherwise} \end{cases} \qquad (EQ.\ 22)$$

If the left-hand side of the regression model formulation in Step 160 is log(Q0't), then SF is never equal to 1. Optionally, the smearing factor (SF) may be ignored.

Continuing with the sales history decomposition method 100, the trend effects are re-estimated in step 180 since the original trend estimate may have the effects of price, marketing instruments and seasonality. While, the re-estimation of trends using the results from steps 170 may use various known trending techniques, a preferred implementation of the present invention uses an enhanced Modified Henderson filter, consistent with the methodology employed in the X-11 filtering procedure. Depending upon what types of short term cycles must be removed; embodiments of the present invention will choose the length of this moving average filter. The Modified Henderson Moving Average filters are calculated by setting negative Henderson Moving Average filters to zero and normalizing all the other positive filters so that they add up to 1.

In the re-estimation of trends in step 180, an estimate of trend for all time-periods towards the end of history is also performed, but typically, the first few periods in history for which a moving average cannot be directly computed are still rejected. In order to compute a moving average for the end time-periods, asymmetric weights are computed. In one implementation, instead of using the asymmetric weights computed by Musgrave which are built on theoretical foundations, the present invention may employ a simple linear regression type extrapolation combined with a symmetric Modified Henderson filter.

In the re-estimation of trends in step 180, the user specifies a k period Modified Henderson Moving Average (MHMA) to be used, where k is an odd number. For each time-period for which a symmetric moving average cannot be used, an extrapolation combined with a symmetric MHMA approach, or "end-weight approach," are used. For example, if sales history is available until time-period h, then an MHMA cannot be computed for the last $$\frac{k-1}{2}$$

time-periods; from $$h - \frac{k-1}{2} + 1$$

to h time-periods. For these time-periods, the trend re-estimation step 180 may follow an end-weight approach. For example, for each time-period t for which an end-weight moving average must be computed, a least squares extrapolation is performed using $$\frac{k-1}{2}$$

time-periods prior to "t" and all time-periods from "t" through "h" (i.e., today). Since the trend re-estimation step 180 needs observations for $$\frac{k-1}{2}$$

time periods following "t", extrapolation is performed for $$\frac{k-1}{2} - (h-t)$$

time-periods. The least squares equation for extrapolation is as follows in Equation 23:

$$\hat{Q}_{e(e>h)}^{0\prime\prime} = \frac{1}{m} \sum_{j=t-\frac{k-1}{2}}^{h} Q_j^{0\prime\prime} + \left(m + e - h - \frac{m+1}{2}\right) \qquad (EQ.\ 23)$$

$$\frac{12}{(m-1)m(m+1)} \sum_{j=t-\frac{k-1}{2}}^{h} \left(j - \left(t - \frac{k-1}{2}\right) + 1 - \frac{m+1}{2}\right) Q_j^{0\prime\prime}$$

where $$m = (h-t) + \frac{k-1}{2} + 1$$

(i.e., the number of observations that are used for extrapolation).

Once, $Q^{0\prime\prime\prime}_e$ have been computed for all future time-periods (i.e., h+1 to $$\left(\text{i.e., } h + 1 \text{ to } t + \frac{k-1}{2}\right)$$

this series is appended to the series $Q^{0\prime\prime\prime}_t$. The combined series now has enough data points to allow computation of an MHMA for time period t, as calculated above in Equation 6. Likewise, an MHMA is computed for all other t that must use an end-weight approach. At the end of trend re-estimation step 180, a revised estimated of trend. $T^1_t$ is obtained, and this trend has values for all time-periods except for the first $$\frac{k-1}{2}$$

time-periods.

Optionally, in step 185, a Mean Revision in Trend may be computed in for convergence tracking purposes. The mean revision in trend will be computed as followed in equation 24.

$$\frac{2 \sum_{t=\frac{k-1}{2}+1}^{t=h-\frac{k-1}{2}} \frac{|T^1_t - T^0_t|}{T^1_t + T^0_t}}{h - 2r} \qquad (Eq.\ 24)$$

At this point, steps 150-185 are iterated or repeated, step 102, until a maximum number of iterations, as specified by the user, has been reached or the convergence measurement calculated in step 285 falls below a pre-defined threshold.

Thus. depending upon how much incremental accuracy is gained, a user may determine how many iterations must be performed.

While the iterations will have similar characteristics in terms of the amount of data to be used, etc., there will be a few differences between the original run and the later iterations, and these differences are highlighted below:

The de-trended sales history step 150 will be consistent between the first and later iterations: i.e., $$Q_t^{i'} = \frac{Q_t}{T_t^i};$$

where i is the iteration number

In the regression of the de-trended sales history in step 160, one difference between different iterations will be in terms of the number of time-periods used for regression. As stated above, the first and the last "r" time-periods for regression are dropped in the first iteration; whereas in later iterations, only the first $$\frac{k-1}{2}$$

time-periods are dropped

The removal of seasonal, price, and MI effects in step 170, will be consistent between the original and later iterations, except for the superscript i of $Q^{i'''}{}_t$; which corresponds to the iteration number Likewise, the re-estimation of trend effects in step 180 will also be consistent between the different iterations.

In computation of mean revision in trend during step 185, different iterations will again differ in the number of time-periods used for computation. As in regression step 160, the present invention include all time-periods except for the first $$\frac{k-1}{2}$$

time-periods starting from the second iteration, where as the first and the last "r" time-periods are dropped for the first iteration. Consequently, the Equation 24 for computing mean revision in trend starting from the second iteration onwards is be modified as follows in Equation 25.—

$$\frac{2\sum_{t=\frac{k-1}{2}+1}^{t=h} \frac{|T_t^i - T_t^{i-1}|}{T_t^i + T_t^{i-1}}}{h - \frac{(k-1)}{2}} \qquad (Eq.\ 25)$$

Continuing with the Sales history decomposition method 100, once a final estimate for trend $T_t$ and seasonality $\delta_k$ has been made, the demand series can be de-trended and de-seasonalized in step 190. Using the same trend profile as Decomposition Group and the same seasonality coefficients, the de-trended and de-seasonalized series are computed using Equation 26:

$$dq_{it} = \frac{q_{it}}{\frac{T_t}{avg(T_t)} \exp\left\{\sum_k \delta_k I_{tk}\right\}} \qquad (EQ.\ 26)$$

where $q_{it}$ is the raw (not normalized) sales history for each DFU i at time period t, and $dq_{it}$ is the detrended & deseasonalized history for each DFU i at time period t. Note that $dq_{it}$ cannot be computed for the first $$\frac{k-1}{2}$$

time-periods.

This de-trended demand series may then be fed into a known market response model (MRM) that estimates the future effects of proposed pricing or supply changes. For example, the MRM tool and method disclosed in co-pending, co-owned U.S. patent application Ser. No. 10/356,717 entitled Market Response Model, the subject matter of which is hereby incorporated by reference in full, may be used with the present invention. Note that the MRM will contain an intercept term in addition to price, marketing instruments and life cycle. This intercept can be interpreted as the average trend level for the DFU.

Figure 2:
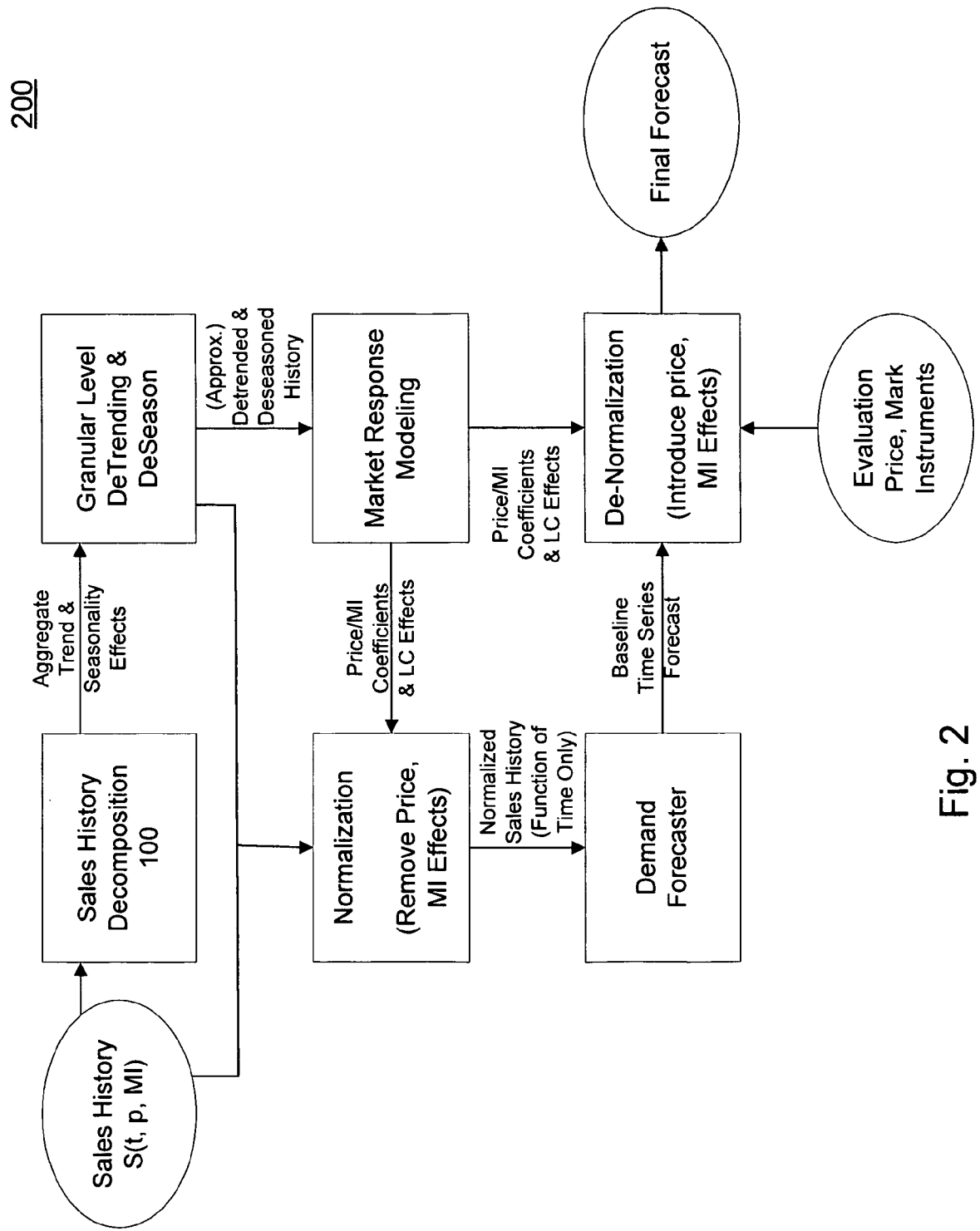
FIG. 2 depicts a high-level diagram of demand modeling incorporating sales history decomposition in accordance with embodiments of the present invention.

Turning now to FIG. 2, an example of a demand estimator incorporating the sales history decomposition method 100 is provided. FIG. 2 provides the high-level logical flow for modeling demand. The process flow gives an insight to the underlying framework and provides initial context to understanding the first component of the framework. The text displayed on arrows in FIG. 2 is information that flows from one process to another. The Sales History is made up of trend, seasonality, price, marketing instruments and other variables, which progresses to an Aggregate Level Sales History Decomposition via an Aggregate Trend & Seasonality effect on to the Granular Level DeTrending & DeSeason. Further progressing via a (Approximate) detrended & deseasoned history to Market Response Modeling proceeding via Price/MI Coefficients and Life Cycle (LC) Effects on to Normalization (removing Price & MI effects) via Normalized Sales History (function of time only) to Demand Forecaster via baseline time series forecast to De-Normalization (introducing price, MI effects) which includes evaluation of price and mark instruments to the Final Forecast.

For example, the results from the sales history decomposition method 100 may be used in a known demand forecaster, such as co-owned U.S. patent application Ser. No. 09/984,347 entitled System And Method For Supply Chain Demand Planning And Forecasting, the subject matter of which is hereby incorporated by reference in full. Likewise, the sales history composition method 100 of the present invention may be incorporated into a known pricing system and method, such as that disclosed in U.S. patent application Ser. No. 09/859,674 entitled Dynamic Pricing System, the subject matter of which is hereby incorporated by reference in full.

Figure 10:
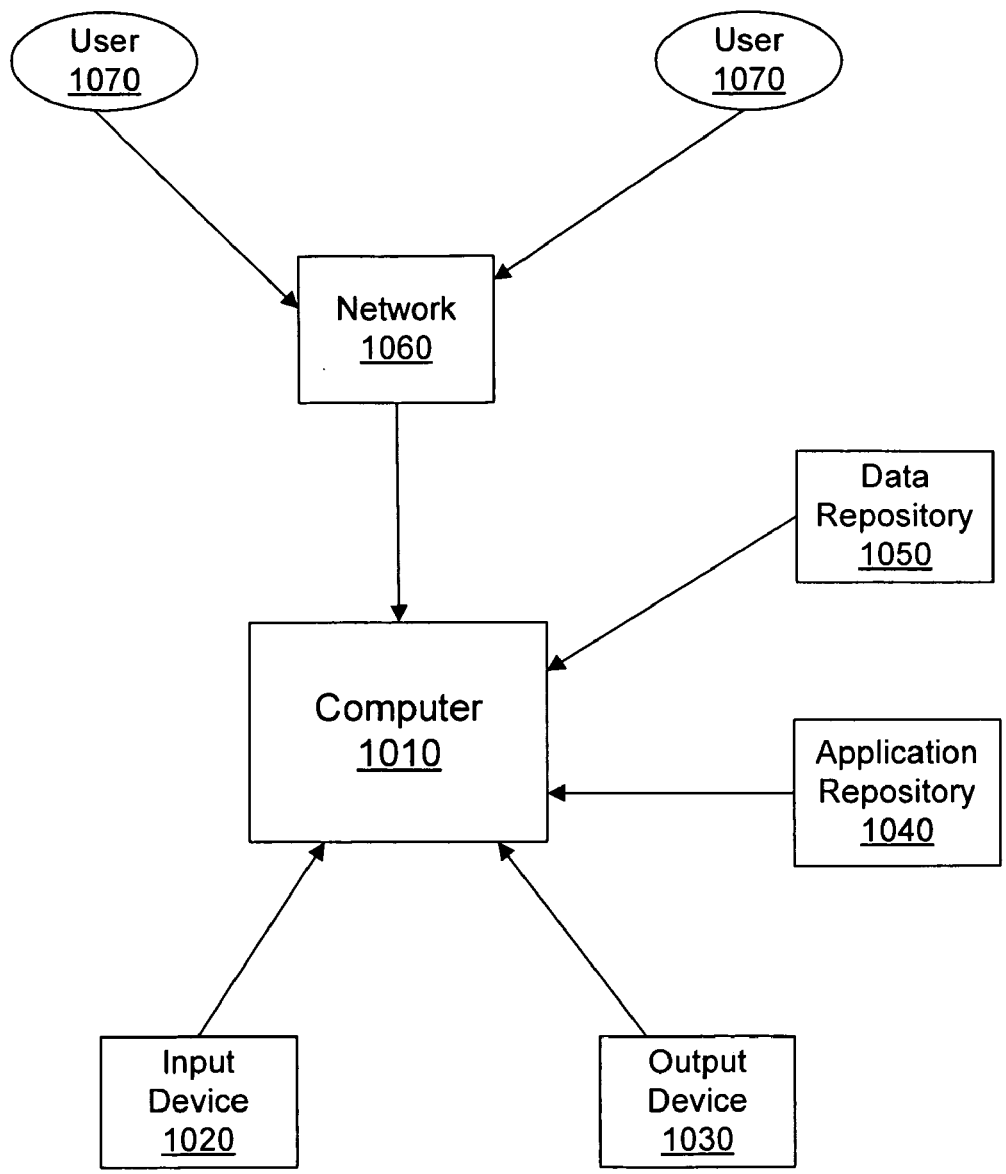
FIG. 10 depicts a sales history decomposition tool in accordance with embodiments of the present invention.

In another embodiment, the sales history decomposition method 100 may be implemented on a computers system 1000 in the form of software modules designed to implement the various steps of the sales history decomposition method 100, as depicted in FIG. 10. Referring now to FIG. 10, a sales decomposition tool 1000 is now provided. Specifically, the sales decomposition tool 1000 provides a computer 1010 that includes an input device 1020 and an output device 1030. The computer 1010 accesses an associated application repository 1040 and a data repository 1050. The application repository 1040 contains modules adapted to implement the various steps 102-195 of the sales history decomposition method 100. Similarly, the data repository 1050 contains the original sales data and the data modified by the various modules in the application repository 1040 as needed to implement the sales history decomposition method 100. Embodiments of the sales decomposition tool 1000 may be connected to users 1070 and a distant data repository (not illustrated) via a distributed network 1060, such as the Internet.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer implemented sales history decomposition method comprising:
   mapping sales data related to demand forecast units to a plurality of demand forecast unit groups for one or more product categories, wherein each demand forecast unit is a unique product identifier code, wherein the sales data relates to actual sales of products, wherein each demand forecast unit is assigned to a demand forecast unit group included in the plurality of demand forecast unit groups wherein demand forecast unit groups correspond to different categories of demand forecast units;
   after said mapping, time slotting of the sales data;
   after said time slotting, aggregating the sales data contained in the plurality of demand forecast unit groups;
   after said aggregating, initial estimating of a trend in the aggregated sales data, wherein said initial estimating includes computing a moving average;
   computing using a computer processor a de-trended sales history using the trend estimate;
   after said computing, using a computer processor regressing the de-trended sales history as a function of price, seasonal, and marketing instrument effects;
   after said regressing, removing estimated price, seasonal, and marketing instrument effects from the sales data using the results of regressing the de-trended sales history;
   after said removing, re-estimating trend effects from the sales data from which the estimated price, seasonal, and marketing instrument effects have been removed;
   computing de-trended and de-seasonalized sales data using the re-estimated trend effects and the sales data from which the estimated price, seasonal, and marketing instrument effects have been removed; and
   outputting the computed de-trended and de-seasonalized sales data;
   the method further comprising repeating the steps of:
   computing using a computer processor de-trended sales history using the trend estimate;
   regressing the de-trended sales history as a function of price, seasonal, and marketing instrument effects;
   removing estimated price, seasonal, and marketing instrument effects from the sales data for the particular product using the results of regressing the de-trended sales history; and
   re-estimating trend effects from the sales data for the particular product from which the estimated price, seasonal, and marketing instrument effects have been removed, wherein aggregating the sales data includes aggregating price ratios, wherein the denominator of the price ratios is an exponentially smoothed average of historical observed prices, and wherein time slotting of the sales data includes computing a reference price.

2. The computer implemented sales history decomposition method of claim 1, further comprising computing a mean revision in trend.

3. The computer implemented sales history decomposition method of claim 1 further comprising: selecting a subset of demand forecast unit groups for analysis of trend and seasonality.

4. The computer implemented sales history decomposition method of claim 3, wherein the selected subset of demand forecast unit groups does not include demand forecast units associated with an incomplete sales history.

5. The computer implemented sales history decomposition method of claim 3, wherein the selected subset of demand forecast unit groups consists of functionally homogenous products.

6. The computer implemented sales history decomposition method of claim 3, wherein the selected subset of demand forecast unit groups consists of homogenous stores.

7. The computer implemented sales history decomposition method of claim 3, wherein the selected subset of demand forecast unit groups consists of homogenous trend and seasonalities and price sensitivities.

8. The computer implemented sales history decomposition method of claim 1, wherein the demand forecast units assigned to demand forecast unit groups relate to functionally homogenous products.

9. The computer implemented sales history decomposition method of claim 1, wherein the demand forecast units assigned to demand forecast unit groups relate to homogenous stores.

10. The computer implemented sales history decomposition method of claim 1, wherein the demand forecast units assigned to demand forecast unit groups are homogenous in trend/seasonalities and price sensitivities.

11. The computer implemented sales history decomposition method of claim 1, wherein the initial estimating of a trend includes computing an n week moving average.

12. The computer implemented sales history decomposition method of claim 11, wherein n is equal to a number of time periods in a season cycle.

13. A computer system, comprising:
   a data repository formed in memory, the data repository containing sales data in the form of demand forecast units;
   an application repository formed in memory containing at least a first module operable by execution on a processor to:
   map said sales data to demand forecast unit groups, wherein the sales data identifies products by demand forecast unit, and wherein the demand forecast unit groups correspond to different categories of demand forecast units;

time slot the sales data;

aggregate the sales data contained in the demand forecast unit groups;

estimate a trend in the aggregated sales data;

first compute a de-trended sales history using the trend estimate;

first regress the de-trended sales history as a function of price, seasonal, and marketing instrument effects;

first remove estimated price, seasonal, and marketing instrument effects from the sales data, using the results of the regressing the de-trended sales history;

first re-estimate a trend in the sales data from which the price, seasonal, and marketing instrument effects have been removed;

second compute a de-trended sales history using the trend estimate;

second regress the de-trended sales history as a function of price, seasonal, and marking instrument effects;

second remove estimated price, seasonal, and marketing instrument effects from the sales data, using the results of the regressing the de-trended sales history;

second re-estimate a trend in the sales data from which the price, seasonal, and marketing instrument effects have been removed;

compute de-trended and de-seasonalized sales data using the second re-estimated trend and the sales data from which the estimated price, seasonal, and marketing instrument effects have been removed; and an output device, operable to output the computed de-trended and de-seasonalized sales data in a human perceptible format; wherein aggregating the sales data includes aggregating price ratios, wherein the denominator of the price ratios is an exponentially smoothed average of historical observed prices, and wherein time slotting of the sales data includes computing reference price.

* * * * *